United States Patent [19]

Iwamura et al.

[11] Patent Number: 5,262,760
[45] Date of Patent: Nov. 16, 1993

[54] MODIFYING A GRAPHICS DISPLAY IMAGE

[76] Inventors: Kazuaki Iwamura, Hitachi Koyasudai Apt. D305, 2-32, Koyasu-cho, Hachiouji-shi, Tokyo 192; Junichi Nakahata, 4-37, Nakamaru-cho 2-chome, Hitachi-shi, Ibaraki 316; Mitsuru Fujii, Ebina-ryo 408, 780-1, Nakano, Ebina-shi, Kanagawa 243-04, all of Japan

[21] Appl. No.: 661,331

[22] Filed: Feb. 27, 1991

[30] Foreign Application Priority Data

Feb. 28, 1990 [JP] Japan .................................. 2-48563

[51] Int. Cl.⁵ .............................................. G09G 5/08
[52] U.S. Cl. .................................. 345/145; 345/115
[58] Field of Search ............... 340/701, 703, 709, 721, 340/723, 724, 726, 727, 747, 712; 395/133, 134, 135, 136, 137, 138, 139, 146, 151, 155, 157; 382/44, 47; 364/488, 489, 490, 491

[56] References Cited

U.S. PATENT DOCUMENTS

| | | | |
|---|---|---|---|
| 4,601,021 | 7/1986 | Paul et al. | 340/721 X |
| 4,627,015 | 12/1986 | Stephens | 340/724 |
| 4,656,603 | 4/1987 | Dunn | 340/721 |
| 4,686,522 | 8/1987 | Hernandez et al. | 340/723 |
| 4,694,286 | 9/1987 | Bergstedt | 340/724 |

FOREIGN PATENT DOCUMENTS

| | | |
|---|---|---|
| 57-134738 | 8/1982 | Japan . |
| 58-3056 | 1/1983 | Japan . |
| 61-269194 | 11/1986 | Japan . |
| 62-60067 | 3/1987 | Japan . |
| 63-108430 | 5/1988 | Japan . |

Primary Examiner—Jeffery Brier
Attorney, Agent, or Firm—Antonelli, Terry, Stout & Kraus

[57] ABSTRACT

A graphics display image is displayed on a display, the graphics display image being formed by a plurality of graphics display image components, at least some of which have to be edited. The graphics display image components may be generated from data obtained e.g. from optical reading of a hard-copy of a map, circuit diagram, or design drawing by a suitable optical reader. The graphics display image components which are to be edited are displayed with a different visual appearance from any components which do not have to be edited, e.g. by highlighting the components to be edited. As the editing of each components is completed, its visual appearance is changed, e.g. the highlighting cancelled, so the operator has an immediate visual indication of the components which have not yet been edited. In this way, complete editing can be ensured. Different editing operations are possible including creating a cursor corresponding to the component to be edited, adjusting that cursor to correspond to the location, size and orientation of the component to be edited, and replacing the component with the cursor image.

20 Claims, 24 Drawing Sheets

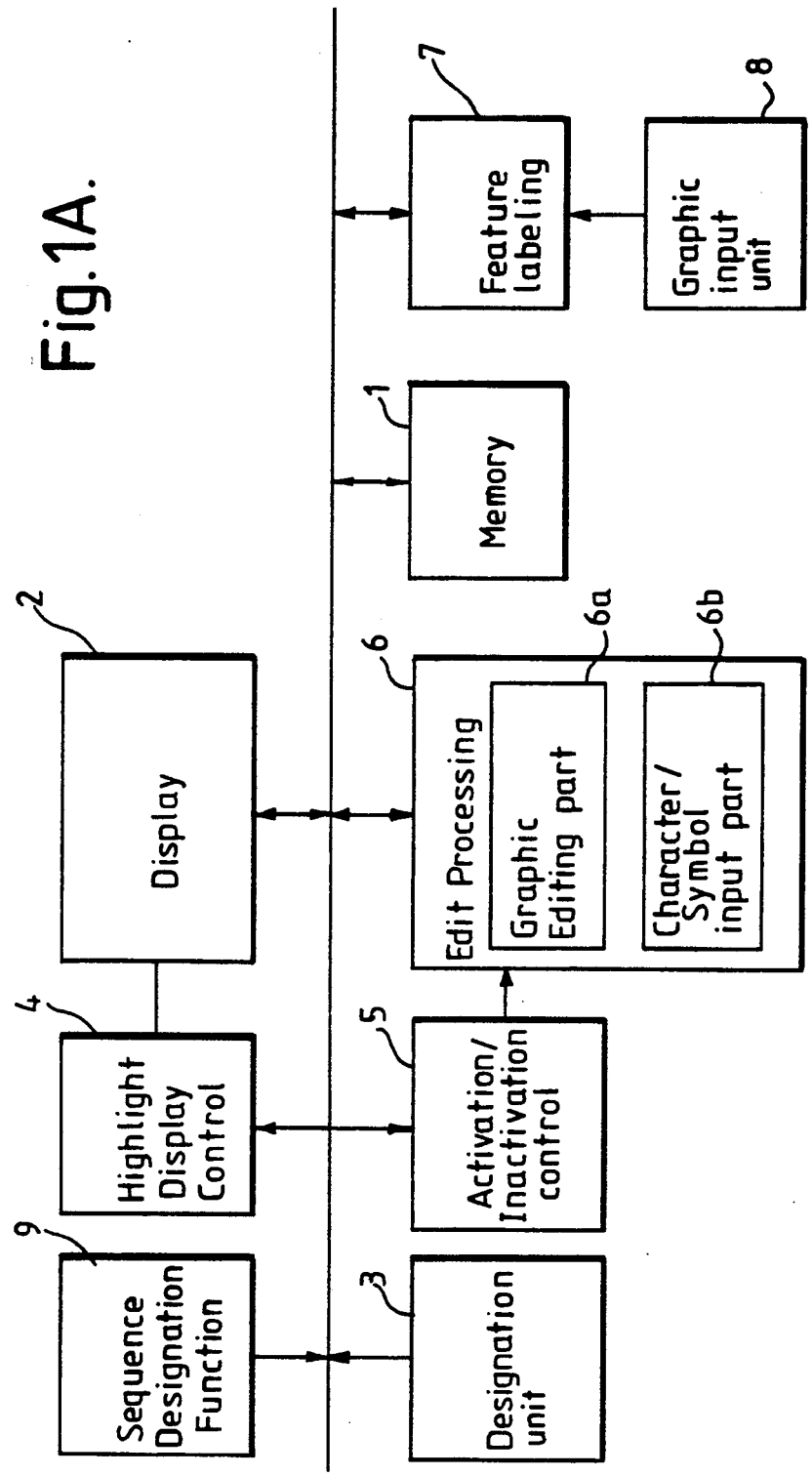

Display screen

Fig. 3(a)
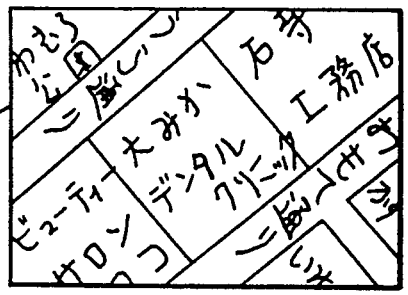
Display screen
Fig. 3(b)
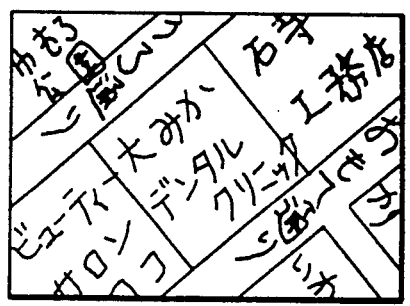
Fig. 3(c)
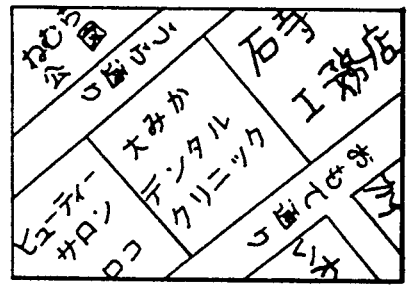
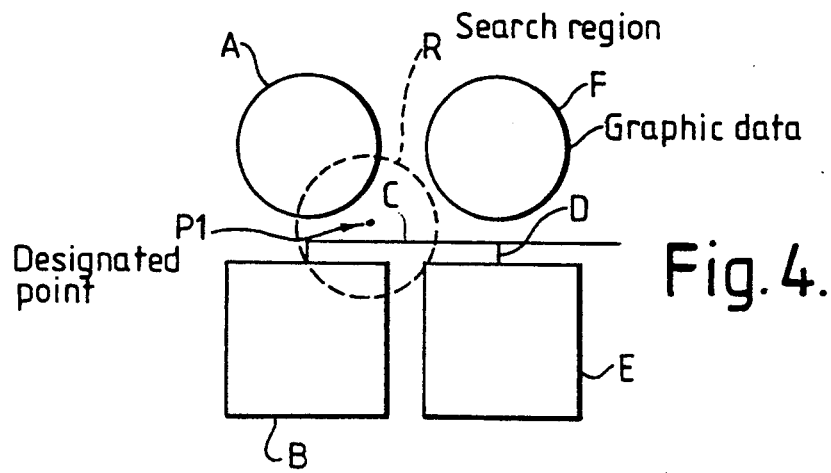
Fig. 4.

| Feature code | Inactivity bit | Hue | Lightness | Saturation |
|---|---|---|---|---|
| 1 | 0 | ----- | ----- | ----- |
| 2 | 1 | ----- | ----- | ----- |
| 3 | 1 | ----- | ----- | ----- |
| ... | | | | |
| n | 0 | ----- | ----- | ----- |
Fig.6.
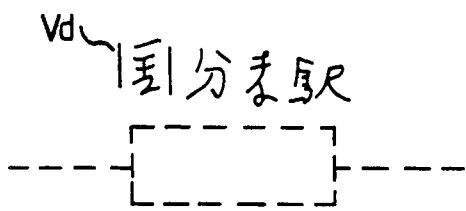
Fig.10(a)
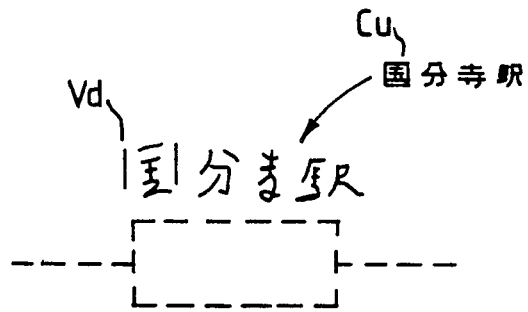
Fig.10(b)
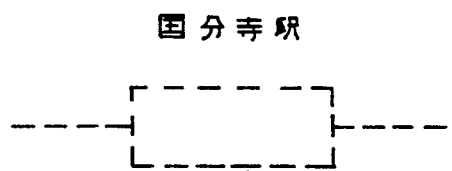
Fig.10(c)

Vd Vector data

Tp Square template

Vd

Vd

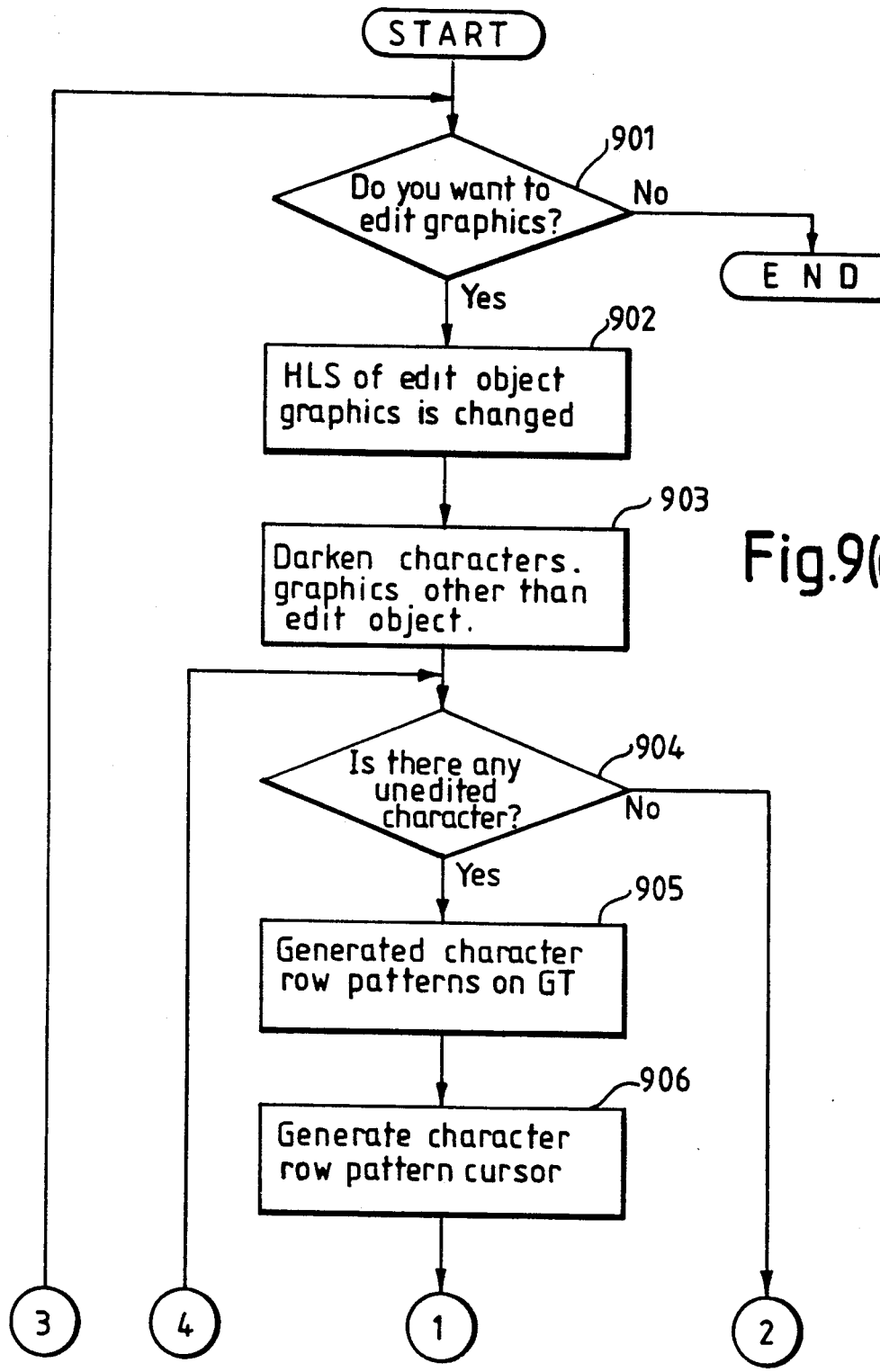

MODIFYING A GRAPHICS DISPLAY IMAGE

BACKGROUND OF THE INVENTION

1. Field of the Invention

The present invention relates to a method and apparatus for modifying a graphics display image. Such a graphics display image may be, for example, a map, circuit diagram or schematic plan, which is made up of a plurality of components.

2. Summary of the Prior Art

It is known to form a graphics display image on a display screen of a suitable display device, by reading or scanning a print (hard-copy) of the image that is to be displayed. The print may be a map, construction blueprint, circuit diagram, design drawing, etc, and may thus include lines, symbols, shadings, etc, which are read by a suitable reading apparatus, and converted to digital data. Once the data is accurately stored in a suitable memory, it can be displayed on a display screen and modified or processed electronically, as desired. Thus, for example, if the print is a map, data representing that map can be stored in a computer, presented on a display screen, and manipulated in order to show a desired part of the map, a desired section through the map etc.

In order to generate the data representing a graphics display image, the print must be read optically, and the resulting data stored. In practice, that data is vector data, i.e. data representing the X and Y coordinates of a multiplicity of points in the image, and the graphics display image is then reproduced from the vector data. However, when a print is read by suitable optical reading apparatus, there are likely to be errors in the reading of the vector data, e.g. due to the thickness of lines, etc on the print, and therefore the displayed graphics display image will not correspond exactly to the original map. Therefore, it is normally necessary for the data representing the graphics display image to be edited before it can be used reliably.

JP-A-63-108430 discloses a system in which an image is formed by characters and image components which are located in separate parts of a display, and in which at least the characters could be replaced. During this replacement (editing), the character part of the display could be emphasized by high-lighting it relative to the part of the display bearing the image components. It can readily be seen that such an arrangement is of limited application only, as it is not always possible to separate a graphics display image in the way proposed in JP-A-63-108430.

In JP-A-57-134738, a graphics display image is divided into a plurality of blocks, each block containing one or more image components, and a block to be edited is high-lighted. Then, the operator prepares a separate, correct, version of the block which is then used to replace the block to be edited in the graphics display image.

In JP-A-57-134738, the block to be edited is high-lighted. More generally, it is well known to high-light part of a display, or to reduce the intensity of parts of a display to emphasise other parts, and examples are shown in JP-A-58-3056, JP-A-61-269194, and U.S. Pat. No. 4,601,021. In JP-A-58-3056, parts of a display of a three-dimensional image are deleted from the display (i.e. their intensity reduced to zero), if they are not visible from the viewing point of the three-dimensional image. In JP-A-61-269194, individual components of a graphics display image may be read and combined together, and some of those components may be high-lighted, or the intensity of others may be reduced, for emphasis. In U.S. Pat. No. 4,601,021, selected components of a graphics display image may be modified by deletion (reducing intensity to zero) of the components not desired, or blinking or otherwise high-lighting the desired components. It should be noted that in JP-A-58-3056, JP-A-61-269194, and U.S. Pat. No. 4,601,021 the disclosure is concerned only with emphasizing parts of the graphics display image, not with editing.

It is also known, from JP-A-62-60067, to provide a visual distinction between graphics display image components which already exist in a database of such components, and newly added components. In JP-A-62-60067, the existing components are shown as thick lines, and the newly added components are shown as thin lines.

SUMMARY OF THE INVENTION

In practice, maps, circuit diagrams, etc have a very large number of components, so that when a print of the map or circuit diagram is read optically, it is normally necessary to edit the data items representing each component of the graphics display image, and this editing is extremely time-consuming. Furthermore, there is the problem that the operator may forget which components have been edited, and which have not. This is true, for example, in the system proposed in JP-A-57-134738 where only the edited component is high-lighted. Therefore, the present invention proposes that the graphics display image components to be edited are displayed, and as each is edited, the visual appearance of the edited component is changed. Thus, there will be a clear visual distinction between the edited and un-edited components.

Thus, for example, all the graphics display image components to be edited may be displayed on the display with a predetermined intensity before they are edited, and as the operator edits them sequentially, and indicates the editing of each has been completed, the intensity of the graphics display image component for which editing has just been completed is reduced, so there is effectively high-lighting of the un-edited components. In this way the operator will have an immediate visual display of the un-edited components and can continue editing until all components have been edited. Of course, there will be situations where only some of the components have to be edited, and in such a case the components which do not have to be edited may be displayed at reduced intensity at the start of the editing operation.

The example discussed above is concerned with arrangements in which the visual appearance of the edited components is changed by reducing their intensity. It would be possible to reduce the intensity to zero, thereby effectively deleting the edited components from the display screen, but it is frequently desirable that the edited components remain visible, because editing may be based on the relationship between one component and another. Then, it is important that the already edited components can be seen by the operator, in order to edit other components. However, the present invention is not limited to arrangements in which the change in visual appearance is represented by changes in intensity. For example, the change may be indicated by changing the color of the edited components.

Furthermore, a wide range of different editing operations are included in the present invention. For example, when a graphical display image component, such as a square, is converted to vector data, and then displayed, the shape of the square may be distorted. In such cases, the editing operation will involve re-shaping the component to the correct square shape. Furthermore, consider the case of a geographical map including contour lines. Then, the editing of the graphics display image component formed by each contour line may involve association of the data for that line with further data representing the height of the contour. It would be possible for that height information to be displayed on a display at the same time as the contour line itself, but it is equally possible for the contour height information to remain within a memory, without being displayed, and editing, within the present specification includes such a possibility. With the present invention, in such a situation, as a height is associated with each contour line, the visual appearance of that contour line is changed, e.g. by reducing its visual intensity, so that the operator can see which lines have not yet been associated with height information.

A further type of editing arises when the graphics display image component is a standard shape, such as a circle or square of known size, or a Japanese written character. In that case, those standard shapes may be pre-recorded, and the editing of the graphics display image component may then comprise the replacement of that component, as shown on the display, with a corresponding pre-recorded component. Such an arrangement is easiest to achieve if a pre-recorded graphics display image component corresponding to the component to be edited is moved on the display screen as a cursor to a position corresponding to the location, orientation, and size of the component to be edited, and then editing can occur directly by replacement. For this purpose, a plurality of pre-recorded components may be stored in a suitable memory, and further components may be formed by combination of a more limited set of pre-recorded components.

Thus, the applicants have appreciated that it is possible to use a cursor which corresponds to the component to be replaced, which cursor is moved to the location of the component which is to be edited. This concept, of a "character cursor" is a separate, independent aspect of the present invention. It is applicable not only to arrangements in which there is a change in the visual appearance of edited components, after editing, but also to other editing arrangements.

Within the present invention, the sequence in which the graphics display image components may be edited may be either entirely at the operator's discretion, or may be constrained. For example, the graphics display image components may be divided into a plurality of groups for which e.g. each group corresponds to a component of a particular shape. Then, if one group is selected for editing, editing of components of other groups will be inhibited until all components in the original group have been edited. In this way, it is easier for the operator to ensure that all components in each group have been edited. In this case, where high-lighting methods are used to change the visual appearance, it is possible to high-light only the group which is then being edited, to reduce the intensity of the edited components of that group, with a second group being high-lighted only when all elements in the first group have been edited.

It can be noted that where the data corresponding to the graphics display image component is vector data, then it is readily possible to edit one graphics display image component even when that component overlaps another component that is not then being edited. In the system of JP-A-57-134738, it is impossible to edit overlapping components because of the need to divide those components into blocks.

In JP-A-62-60067 discussed above, there is no suggestion that there is any change in the newly added graphics components after editing. Furthermore, it is not practical to use the system of JP-A-62-60067 for complex maps, because the thick lines of the existing components will obscure the newly added components.

In practical use, the image components may be stored as a database to which a multiplicity of users have access. In that Case, the setting-up of the database may involve sequential editing of the database, and the users may themselves add additional information to the database, and edit that new information.

As was mentioned above, the present invention is particularly, but not exclusively, concerned with the case where the input of the data representing the graphics display image components are obtained by optical reading of a print of e.g. a map, circuit diagram, etc. There is currently a need to be able to reproduce maps, etc, electronically, and the present invention permits the creation of electronic maps to be achieved more rapidly and accurately than existing methods.

BRIEF DESCRIPTION OF THE DRAWINGS

Embodiments of the present invention will now be described in detail, by way of example, with reference to the accompanying drawings, in which:

FIG. 1A is a block diagram showing an outline of a configuration of a first embodiment of an apparatus for modifying a graphics display image according to the present invention;

FIGS. 3(a), (b), (c) are flowcharts explaining the flow of character processing;

FIG. 4 explains arrangements of graphics components adjacent a cursor;

FIG. 6 shows an example of the data tables that store graphics parameters such as hue, lightness and saturation;

FIGS. 9(a) and 9(b) show an example of flowcharts for character processing algorithms;

FIGS. 10(a) to 10(c) are diagrams for explaining an example of character processing;

DETAILED DESCRIPTION

Figure 1B:
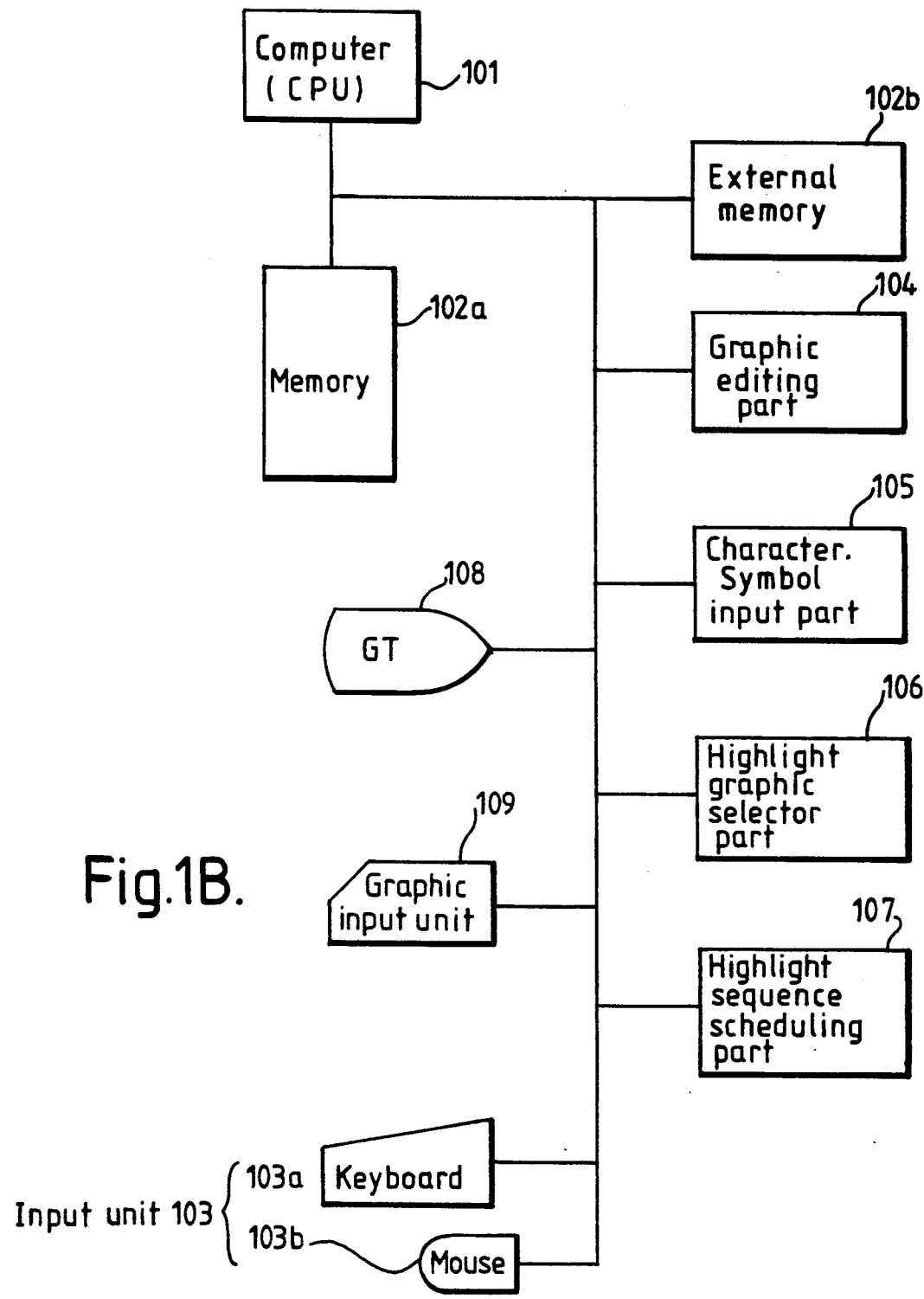
FIG. 1B is a block diagram showing in more detail the configuration of part of the first embodiment.

A first embodiment of the present invention will now be described. In this first embodiment, the present invention is applied to graphic editing, where the graphics display image components are patterns or shapes, rather than characters. However, the embodiment is not limited thereto. In the following description, the data representing a graphics display image component is referred to as "graphics data", the displayed component is referred to as a "graphics component", the term "graphic" is used for the abstract shape or pattern of a graphics component, and "graphics object" is used to refer to graphics data when printed on hard-copy.

FIG. 1A shows a graphic edit processing unit which has a memory 1 for storing a plurality of groups of graphics data, each group comprising graphics data representing a plurality of graphics display image components (graphics components); a display 2 for displaying a whole or a part of the stored plurality of graphics data; a designating unit 3 for designating at least one of the plurality of groups of graphics data for display; a highlight display control unit 4 for highlighting only graphics components of the designated group(s) of graphics data, and cancelling the highlighting of those graphics components upon completion of editing thereof; an activation/inactivation unit 5 for activating, ready for editing, only the graphics components of the designated group(s) of graphics data preset or designated and controlling the processing unit to prevent editing of each graphics data for which editing has already been completed. FIG. 1A also shows graphic processing unit 6.

The graphic edit processing unit of this embodiment is also provided with a graphic input unit 8 for reading graphics objects drawn on a sheet of paper or other hard-copy, and converting those graphics objects into electrical graphics data; a feature attribute labelling unit 7 for labelling input graphics data according to each graphics object, and categorizing the graphics objects into one or more graphics data groups; and a sequence designation function unit 9 for highlighting graphics of a particular group of graphics data of the groups of graphic data in accordance with a preset group order.

The graphic processing unit 6 is provided with a function 6a for generating shaped graphics components to be displayed, corresponding to the graphics included in the graphics data, editing the generated components by overlying each graphics component and recording edited graphics data; and a function 6b for generating pre-recorded computer components, graphics components corresponding to character patterns and/or symbol patterns to be entered of similar size corresponding to graphics components of characters and/or symbols in the graphics data, arranging same in the corresponding positions, and recording the data of the edited graphics components of characters and/or symbols.

Modifications of this embodiment are possible. For example, the graphic processing unit 6 may have only one or other of the graphic editing parts 6a or the character/symbol input part 6b according to the type of graphics data to be edited. The highlight display control unit 4, activation/inactivation control unit 5, graphic input unit 8, feature labelling unit 7, or sequence designation function unit 9 may be omitted, if not needed for graphics data to be edited in any particular case.

Next, a more detailed configuration of part of this embodiment of the present invention will be explained with reference to FIG. 1B.

The graphic edit processing unit of this embodiment preferably comprises a computer 101 for controlling system operation; an internal memory 102a and an external memory 102b for storing graphics data of graphics (shapes, characters, symbols etc.) and operational programs of the computer 101; an input unit 103 which acts as an operator machine interface; a graphic editing processing part 104; a character/symbol input part 105; a highlight graphic selection part 106; a highlight sequence scheduling part 107, a colour graphic display unit 108 (hereinafter referred to as a "GT") for displaying graphics components in colour; and a graphic input unit 109 for entering and reading graphics objects.

The computer 101 carries out system control and operation, such as start-up of each functional component 104 to 107. The computer 101 also controls data transmission and reception, control of timing, control of GT 108 and the graphic input unit 109, in accordance with the instructions in the programs stored in the memory unit 102a. The computer 101 will be referred to subsequently as a "CPU".

The memory unit 102a may be in the form of a random access memory (RAM) and temporarily stores e.g. programs, graphics data, various tables. The external memory 102b is a memory device which may be, for instance, a magnetic disk file, or optical disk file and can store a large quantity of graphics data and/or programs.

The input unit 103 is provided with a keyboard 103a and a mouse 103b. The operator gives commands to the system through this input unit 103. The input unit however, is not limited to the above-mentioned devices, and, for instance, a touch panel, or tablet input device may alternatively be used.

The graphic editing part 104 has a graphic edit processing function, whereby designation of graphics components to be edited, addition or deletion of lines, shaping of patterns, correction or the like are performed.

A character/symbol input part 105 is provided, for instance, with a kana-kanji (Chinese character) conversion function and/or document processing functions and the character/symbol input part can cut out a character/symbol region or segment/recall character/symbol patterns from a ROM for display on the GT 108, move freely the characters/symbols of a cursor on the display, arrange the characters/symbols in desired positions, then store information of their position or size as data.

The highlight graphic selection part 106 designates the colours of specific characters/symbols to be entered, judges whether a selected graphics component belongs to a selected group of graphics components and highlights designated graphics components by changing the contents of a registration table where highlight information is stored.

The highlight sequence scheduling part 107 schedules the sequence of highlighting according to the kinds or categories of the groups of graphics components, e.g. by shapes, or characters/symbols.

In this embodiment, each block 104 to 107 may be composed of an independent unit provided by a computer or a hard logic device. Alternatively, the whole or some of the above blocks 104 to 107 may be integrated into a single hardware system, and/or the function of blocks 104 to 107 may be achieved by programs in the computer 101.

The graphic input unit 109 is a device such as e.g. a digitizer, or scanner for reading graphics objects (parts of maps, circuit diagrams, or designs) drawn on a sheet of paper or other hard-copy to convert those graphics objects to digital information. The graphics objects may thus be entered by optical scanning, and converted to graphics data. The present embodiment is also able to express the graphics data as vector data through a vector algorithm.

In this embodiment, the colour characteristics of hue, lightness and saturation (HLS) are used as parameters for the highlighting of the display. The feature codes shown in FIG. 6 are determined by these parameters, but the embodiment is not limited to these parameters alone. For example, they may be replaced by Red, Green and Blue (RGB) parameters. The graphics data may be vector data based on rows of co-ordinates but enhancement to pixel data is also readily possible. The table shown in FIG. 6, may be stored for example, in the memory 102a.

Next an embodiment of methods of operation of the graphic edit processing units will be explained with reference to the processing of actual graphics components as shown in FIGS. 2 and 3, where the above-mentioned graphic processing unit is used.

First, consider the entering of graphics data into the graphic edit processing unit. When there are many graphics objects to be entered, the input of computer graphics data directly to the computer 101 is very inefficient. Instead, the graphic input unit 109 which performs image scanning like an optical scanner, is used. The graphic input unit 109 receives the graphics drawn on a sheet of paper through image scanning, and converts the same into graphics data and into vector data through a vector algorithm. The image scanning and vector algorithm have not been specified in particular. However, it should be noted that, a line that should be straight or a corner that should be a right angle may become a zigzag line or distorted as the result of vector transformation, so that it can not be used directly or without some correction.

Figure 2A:
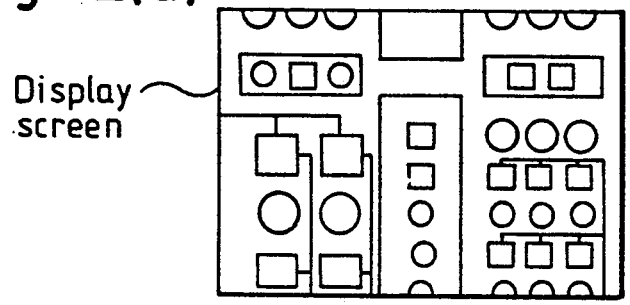
FIGS. 2(a), (b), (c) are flowcharts explaining the process of edit processing.

When entering drawings by image scanning, the graphics components may be categorized into groups according to the kinds of graphics and entered by groups. For example, when entering such graphics as shown in FIG. 2(a) of circles squares, rectangles, and connected lines, the graphics objects are drawn on separate sheets of e.g. tracing paper, divided into categories and the sheets of tracing paper are optically scanned in the graphic input unit 109. After vector conversion of graphics data, each vector data is labelled with colour information assigned as a feature (attribute) code.

Further, such feature codes are not limited to colour or hue data. For example, different kinds of lines such as solid lines, broken lines, dotted lines or the like, or the thickness of the line or the like may be used also as feature codes. If a colour display monitor is used as the display a colour or hue code is used to help the operator to recognise objects more easily.

Corresponding to each of the circles, squares, rectangles, and connected lines set up under these conditions, respective groups of graphics data are set up. Each group of graphics data is labelled with colour or hue information specific to its group so as to be distinguishable from other graphics data.

Also, when the graphics objects include characters and symbols, these may be categorized in a similar way.

Each of the circles, squares, rectangles, connected lines, characters, and symbols is set up to fall into different categories or groups. Each group of graphics data constitutes an aggregate consisting of one of more graphics (such as shapes, characters, symbols and the like) each in the form of vector data.

Next, respective graphic data are combined to be displayed together on the GT108, the graphic data being displayed in different colours. Graphics components of the same group of graphics data are displayed in the same colour, while graphics components of different groups of graphics data are displayed in different colours.

The above categorization by colour can be performed by the operator on the graphics object which are being entered through the graphic inputunit 109. Otherwise, the graphic input unit 109 may be designed to perform the above categorization directly upon instructions.

Also, it is possible for graphics objects to be drawn on a sheet of paper in different colours for different kinds of graphic to be entered into the grpahic input unit 109, so that the graphics data is distinguished by the colour detected, and converted to vector data so as to differentiate between the different graphics. In this case, the graphic input unit 109 will need to be provided with a colour sensor device.

Further, the colours may be specified with a barcode or the like, thus barcodes or the like may be arranged in a corresponding position on the display screen. In such a case, the graphic input 109 will need to be equipped with a barcode reader.

Vector conversion is carried out in the graphic input unit 109 in this embodiment, but it may be done in the computer 101, or may be done in a dedicated vector converter device provided specifically for this purpose.

For a very complicated drawing (e.g. a complex map or circuit diagram) the constituent elements (graphics objects) of the drawing sheet may be categorized roughly into units and be drawn on a different sheet of paper according to each unit, then each element in the same unit may further be subcategorized and drawn in different colours.

In this way, the graphics data may be prepared and then stored in the memory unit 102a.

When dealing with a large quantity of graphics data, the graphics data may be stored in the external memory unit 102b, and the data necessary for a particular operation may be transferred to the memory unit 102a on demand, to be displayed and processed. Also, in such applications where graphic entry and its edit processing are contemplated to be done in separate units, or editing is to be performed on the graphics data prepared in a different system, the graphics data before processing may be stored in the external memory unit 102a. Of course, the external memory unit 102b may be used to store graphic data that has already been processed, or may store various tables and the like to be set up when highlighting or editing particular graphics components.

The graphics data having been synthesized and displayed as described above is often accompanied by apparent deformations (distortion, omission or deformation at the corners) because of imperfections of the graphics objects themselves, or due to quantizing errors of input data at the time of entry.

The graphics components displayed on the GT 108 have no specific structure or interrelationship at all between the components, even though such structure may appear to represent normal graphics, because each graphics component is broken, e.g. split into unit lines by vector conversion. Thus, the graphics components for instance, appearing as squares in FIG. 2(a), cannot be determined as forming real squares from the structure of the graphics data even though they may appear to be so, because their apparent constituent unit lines are unrelated vector data. For the graphics data to be used effectively, it is necessary for each graphics component to be identified correctly.

For this purpose, a process to identify each graphics component, as well as to correct its apparent deformation, is required. This process for identification and editing will now be described. This invention also may be used for printing out graphic designs only (i.e. where there is no permanent record of the editing).

Suppose that the square graphics components in FIG. 2(a) are deformed and need to be corrected, and that these square graphics components are distinguished from others because of inbedded feature codes.

Figure 2B:
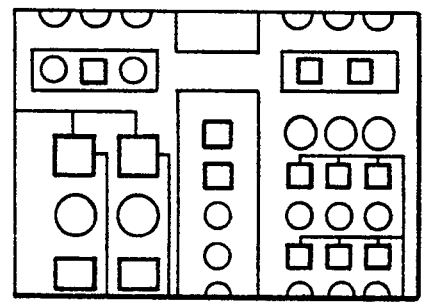

The square graphics components may be corrected for deformations by displaying only those graphics components on the screen. In order to prevent overlapping however, all the graphics components will have to be displayed because the relative positions of the graphics components are important. It is probable that one or more corrections will be missed unless great care is taken because a large number of graphics components are distributed with high density over the display screen. Therefore, the intensity (brightness or lightness) of the square graphics components is increased and/or the intensity of other graphics components is decreased, as shown in FIG. 2(b) where only the square graphics components are highlighted.

A group of graphics components to be highlighted may be selected by entering a highlight display graphics group selection command and a specific colour code particular to the corresponding group of graphics data from the input unit 103. The command or designation of a feature code (in this case a colour code), may be entered, for instance, from the keyboard 103a in a prescribed input format. Alternatively, this may be accomplished by setting icons on the GT 108 display corresponding to commands or colour designations. Associated icons may then be click-selected by the mouse 103b. By use of the latter, manipulation by the operator will be much expedited, and the work efficiency will be increased.

Further, highlight display of graphics components corresponding to one or more groups of graphics data may be controlled automatically to occur in a sequenced order in accordance with a highlight sequence scheduling preset in the highlight sequence scheduling part 107. For example, if the present highlight sequence is scheduled to occur in the order of groups of graphics data corresponding to circles, squares, rectangles, and to connected lines, the graphics components for the group of graphics data corresponding to circles will be highlighted first. Upon termination of the editing of the circles, the groups of graphics data corresponding to squares are highlighted and after the same editing of the squares, then the rectangles are highlighted and this is repeated until all editing is completed. Moreover, when there is a necessity for editing characters, symbols and the like, this can be included at some stage in the sequence.

The highlight sequence scheduling is capable of being set up by the operator through the input unit 103 in a preferred order of graphics data. This highlight sequence may alternatively be set up automatically in the graphic input unit 109 in a consecutive order of input. The highlight sequence scheduling part 107 accepts the set-up data, and produces a schedule table indicating a highlight sequence to be set up in the memory unit 102a. In this schedule table, the sequence is set up for each feature code. The sequence information may also be added to the table shown in FIG. 6.

In order to perform the above sequence administration, the highlight graphic selection part 106 will monitor whether all the graphics data in a particular group of graphics data have their highlighting cancelled, noting that each graphics data in a particular group of graphics, data has its highlighting cancelled when thereof is complete. The highlight graphic selection part 106, upon confirmation of the cancellation of the highlighting of all graphics data in the group, instructs the GT 108 to highlight the next priority group of graphics data by referring to the schedule table or to inactivity flags which will be explained later.

Highlighting may be achieved by increasing the intensity (lightness) of a graphic component for instance, that of a square, above the normal intensity (lightness). Working a long time with increased intensity (lightness), however may fatigue the operator's eyes, eventually decreasing work efficiency. In this embodiment, therefore it is desirable that highlighted is achieved while retaining normal intensity (lightness)of the square graphics components. Therefore the intensity (lightness) of other graphics components is reduced or dimmed, so as to provide a relatively higher intensity (lightness) for the square graphics components. Thus, a highlighted display can be achieved with minimum operator eye fatigue.

Then, the graphics components which are highlighted are corrected and edited sequentially.

Figure 2C:
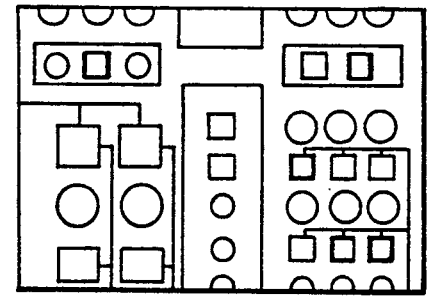

Graphics components for which the editing is complete are darkened or dimmed in intensity (lightness), cancelling their highlighting . This will leave unedited graphics components still highlighted as shown in FIG. 2(c). Thus incomplete editing will be readily seen.

It is possible for the un-edited components to blink or flicker to highlight them. This is not preferable, however, except for giving an alarm or warning, because when a large number or graphics components are blinking, the operator will be under strain and will get tired.

Before starting editing of the graphics components, is necessary to designate specific graphics components first. However, when it is requested to search graphics located within a specific range from a specification pointer as shown in FIG. 4, the operator needs further to select the desired graphics components to be processed from all the graphics components (including dimmed graphics) retrieved within the specified range. For example in FIG. 4, when a point P1 is specified, a range R, and components A, B, and C are selected as they are included in the retrieval range.

If only a certain type of graphics components can be selected for this purpose, the number of steps for graphic selection can be reduced. This will be accomplished by activating (which means to make accessible) only the highlighted graphics components and inactivating all other graphics components. This will be achieved by setting up activation/inactivation flags in the graphic data. FIG. 6 shows an example of a code table where inactivation bits are set up as the activation-/inactivation flags corresponding to the feature codes which specify groups of graphics data.

When only the highlighted graphics components are accessible for editing, the number of steps involved in graphics selection/rejection will be reduced. This is because the inactivated graphics will not be selected through flag judgment, speeding up the editing.

Figure 5:
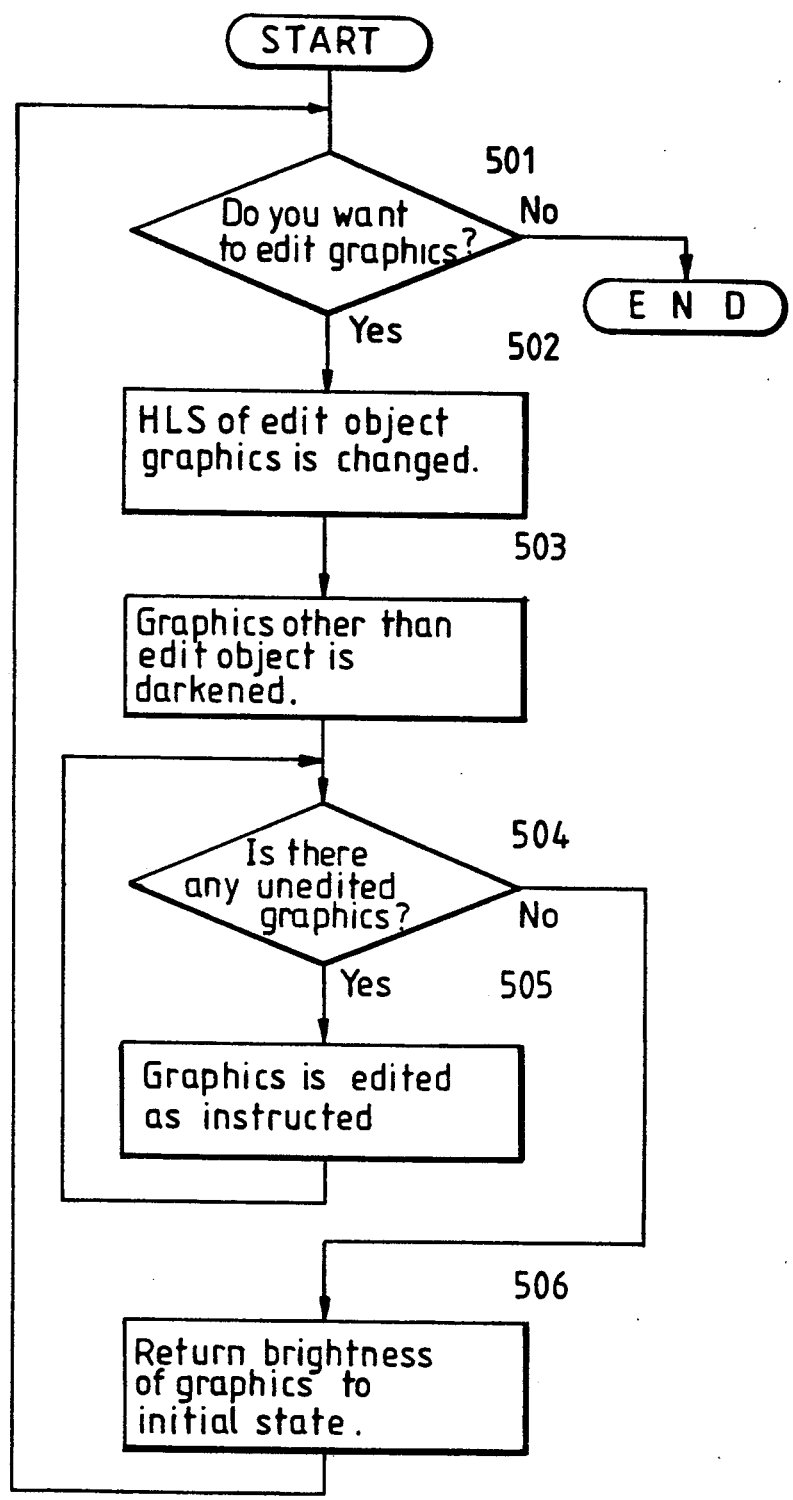
FIG. 5 is a flowchart showing an example of algorithms for graphics processing.

In the following, an example of an algorithm for editing graphics data will be described with reference to FIG. 5.

The flow of the algorithm is controlled by CPU 101, which monitors the reception of an instruction from the input unit 103. Upon reception of a command from the operator throught the input unit 103 to start processing, a guide message is displayed on the GT 108 to select a specific graphics to find out the feature of the graphics components to be highlighted. The operator designates directly the specific graphics components on the screen using the mouse 103b, or the colour of the graphics components through the keyboard 103b. Upon completion of commands from the operator the CPU 101 will start up the highlight graphic selection part 106 in step 501.

The highlight graphic selection part 106 obtains features such as hue code and the like of the designated graphics components by referring to the graphic data table. The intensity (lightness) of graphics components other than the selected components are altered in the table as shown in FIG. 6 in step 502. For instance, when graphics components with feature code n are selected to be processed, the intensity (lightness) of graphics components having feature codes other than n is reduced.

The highlight graphic selection part 106, under the control of CPU 101, transfers the contents of this table to the GT 108, and controls the display to dim graphics components other than the selected graphics components to be edited (step 503).

By the steps described above, only the selected graphics components are highlighted, facilitating rapid editing.

Next, the CPU 101 starts up the graphic edit processing part 104 for performing graphic editing. The graphic edit processing part 104 scans the display for any un-edited graphics components and if there are any, editing continues on the un-edited graphics components in steps 504 and 505 in response to the operator's command, as will be described below. This editing is continued until there are no more unedited graphics components (step 504). In this case, highlighted graphics components appearing on the GT 108 will notify the operator that there still remain un-edited graphics components, thus preventing omission of editing of some of the components.

Upon completion of processing, the CPU 101 moves its operation from the graphic edit processing part 104 to the highlight graphic selection part 106. The hightlight graphic selection part 106 restores the intensity (lightness) of all the graphics components to the initial lightness in step 506.

An example of the graphic edit processing performed in the above step 505 will be explained with reference to FIG. 7. The example refers to editing of square graphics components.

Figure 7A:
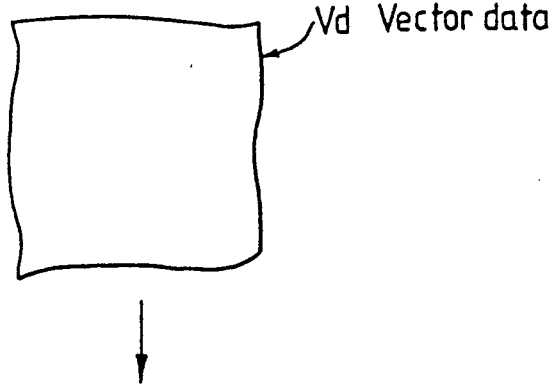
FIGS. 7(a), (b), (c), (d) explain an example of graphic processing.

FIG. 7(a) shows vector data V immediately after vector conversion and lines thereof are shown distorted, cut and broken at the corners of the square.

During editing, the graphic edit processing part 104 automatically generates a shaped graphics pattern as a cursor template Tp, representing the desired shape of the graphics component, from commands from the operator through the input unit 103. As this example is concerned with the shaping of a square, the cursor template Tp of an object square is generated.

The cursor template is capable of being generated in a discretionary form of graphics upon the operator's commands. Still further, such typical graphic patterns as squares, circles, rectangles and the like may be prerecorded to be recalled for reuse. Moreover, similar patterns of different sizes may be generated simply by specifying a desired scaling on the basic patterns provided.

Figure 7B:
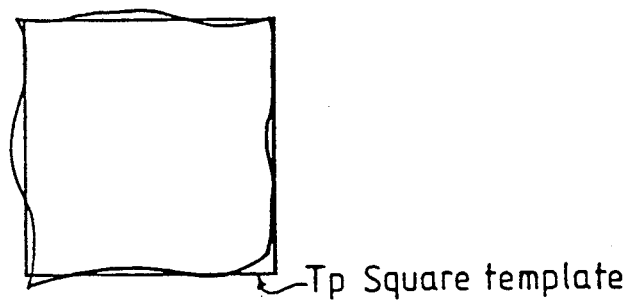

Next, the operator manually moves the square cursor template Tp generated automatically in the graphic edit processing part 104 by entering a command through the input unit 103 (mouse 103b), so as to overlap the vector data Vd which requires correction. This is shown in FIG. 7(b).

Figure 7C:
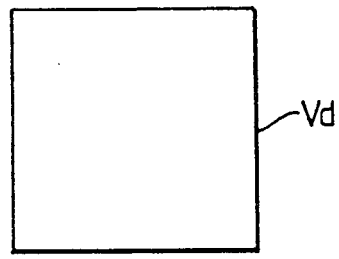
Figure 8B:
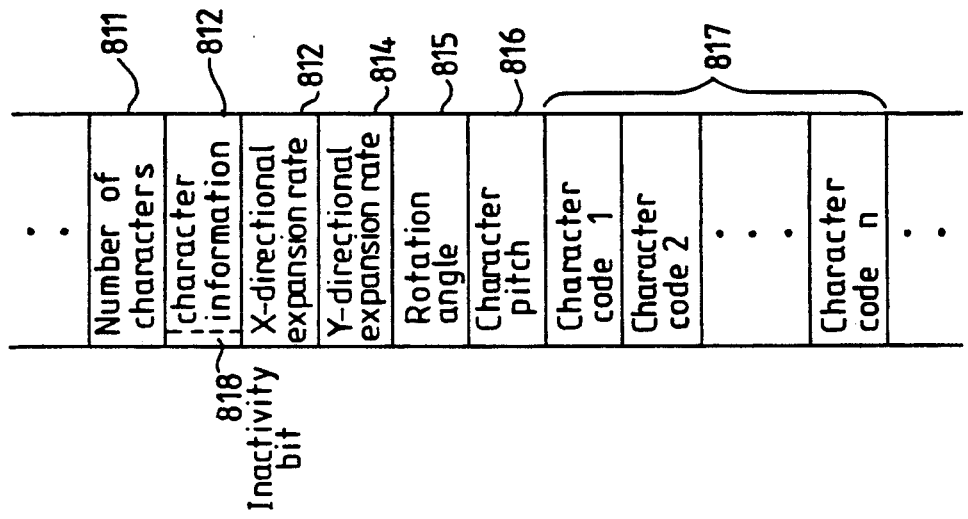
FIGS. 8(a) and (b) show examples of the construction of graphics and character tables.
Figure 8A:
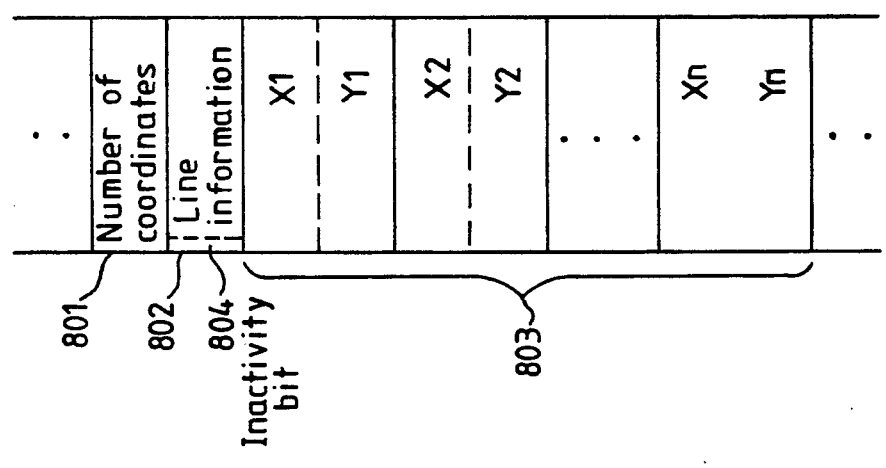

When the operator commands the shaping operation either by the keyboard 103a or the mouse 103b, the graphic processing unit 104 obtains the vector data of the graphics components which falls within a specified range from each line element of the template referring to a table shown in FIG. 8(a), and pulls the same onto the template. Thus, the vector data groups in the vicinity of each constituent line of the template are replaced by vector data which correspond to each side of the square. Corner sections are connected at right angles, and the dots pulled onto the straight line are erased. FIG. 7(c) shows the redrawing of the graphics component after editing.

The table in FIG. 8(a) contains the number of coordinates 801 for vector data, line information 802 and coordinate values 803.

The vector data Vd for an edited square graphics components may have an identification code appended thereto so as to be identified as a set of data. This can be done by the operator's command through the input unit 103. This code may be attached automatically in the sequence of shape processing. Graphics data labelled with identification codes as having specific attributes are capable of being used widely in various applications.

The graphic edit processing part 104 generates new graphics data in the memory unit 102a to record the above shaped vector data Vd. This data may be recorded in the table in FIG. 8(A) by replacing the previous data.

Figure 7D:
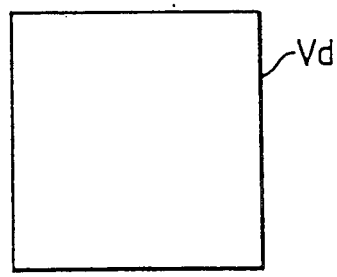

When the operator pushes down the update key on the keyboard 103a (indicating the completion of editing) the highlighting is cancelled as shown in FIG. 7(d) by means of the highlight graphic selection part 106.

With the known systems it is necessary first to specify a region which contains graphics components to be processed before selecting those components. Without any bounding constraint, therefore, graphics components other than the desired graphics component may be selected. Thus, it becomes necessary for the operator to determine which graphics component is to be selected, which, however, requires a lot of work especially when the graphics components are dense and complicated. Therefore, a process for setting up an inactivation flag in that graphics data which does not require highlighting is added to the step 504. In this way, the highlight graphic selection part 106 selects only desired graphics components on the basis of the flag. Consequently, the efficiency in editing of graphics components is greatly improved because of the reduced need to decide whether the selected graphics components satisfies the intention of the operator.

This flag may be set up for instance, as an inactivation flag 804 in FIG. 8(a). The flag also may be considered to be added to the table in FIG. 6. In this latter case, there is no need to set up the flag in the vector data, and the process of erasing the flag after finishing editing is not needed.

An example of editing of characters which are combined together in a display will now be described, making use of the apparatus of the embodiment shown in FIG. 1B.

FIG. 3 shows an example of input of characters. Here, the patterns of handwritten characters are replaced by shaped patterns of the characters.

The distinction between the characters and graphics components other than the characters may be made by feature codes. In FIG. 3(a), however, the shapes of the characters are given as data only with no specific meanings attached thereto. The characters sometime protrude beyond the region within which they should be contained; therefore it is necessary to display the characters and the other graphics components at the same time. In this operation, the colours or hues of the characters are designated, and the intensity (lightness) of the graphics components other than the characters is reduced which state is shown in FIG. 3(b).

When the operator finds character data on the GT 108, he(she) generates corresponding shaped patterns, and rotates/enlarges/reduces these patterns, to overlap the patterns corresponding to the characters, on the design drawings handwritten characters. When the shaped character rows are placed correctly, the characters from the design drawings are erased or their intensity (lightness) reduced as shown in FIG. 3(c). This sequence of operation is repeated until there are no more highlighted graphics components. When the characters that should have been edited are missed, they will be highlighted; thus omission of editing will be easily identified.

Figure 9B:
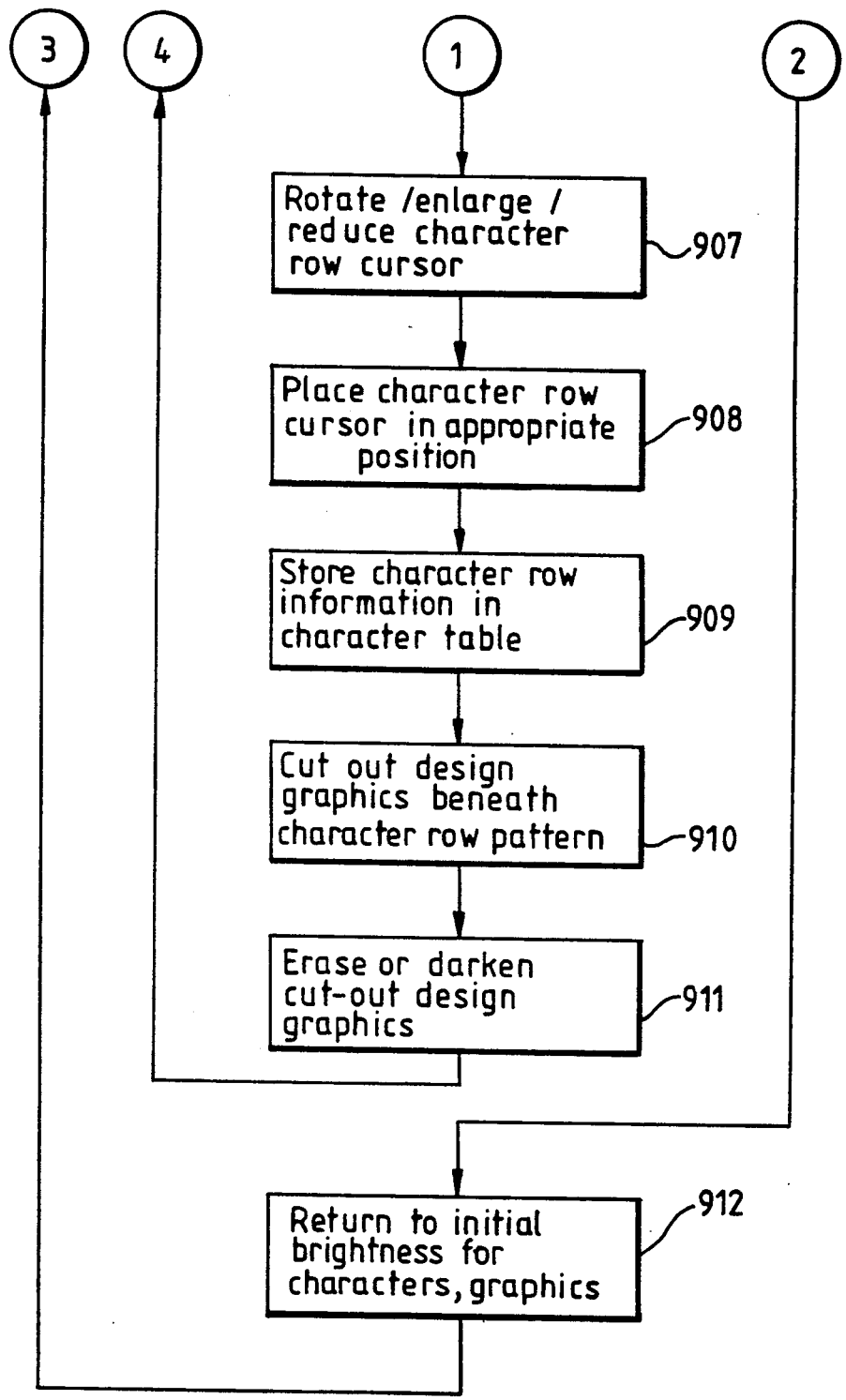

Next, the algorithm for inputting character data will be described with reference to FIG. 9.

Here, the distinction between the characters and graphics other than the characters shall be made by colour codes. The characters, however, correspond only to shape data, and not to their meanings, which are not recorded.

The control of the flow of the algorithm is carried out by the CPU 101. The CPU 101 responds to commands from the operator through the input unit 103. On a command from the input unit 103 by the operator to start character editing, the CPU controls the GT 108 to display e.g. guide messages to help to select desired characters, and to find the features of the characters to be highlighted. The operator directly designates characters on the display using the mouse 103b, or by designating colours of the characters through the keyboard 103a. After the commands from the operator are completed, the CPU 101 starts up the highlight graphic selection part 106 in step 901.

The highlight graphic selection part 106 obtains features of the designated characters such as the hue code by scanning the character data table set up and stored as vector data in the memory 102a. The intensity (lightness) of the graphics components other than the desired characters is altered and entered into the table shown in FIG. 6 at step 902. For instance, when the feature code of characters preferred to be processed is n, the intensity (lightness) of characters having feature codes other than n is set to be low.

In processing characters, when there are a plurality of graphic data groups having different feature codes, i.e. when the characters of a plurality of classes have been entered separately, the groups of graphics data of characters that do not have the designated feature code have reduced intensity (lightness).

Also, when locating characters within frames consisting of e.g. lines, if these frames are also highlighted to distinguish them from others, work efficiency may be improved. In this case, two or more groups of graphics data may be highlighted.

Furthermore, characters and their related background graphics components may be defined to belong to the same groups of graphics data. In this case, the characters and their related background graphics components will be highlighted at the same time by a single command.

The highlight graphic selection part 106, under the control of CPU 101, transmits the contents of the table to the GT 108. When these contents are received, the GT 108 displays the characters with the intensity (lightness) of those characters, other than the characters to be edited, being reduced (step 903).

This state is shown in FIG. 10(a), where the background figures to be displayed with reduced intensity (lightness) are shown by dotted lines to make the Figure easier to understand. The solid lines show character data and indicates that the characters are of full intensity. Thus, only the desired characters are highlighted, giving easier editing.

Next, the CPU 101 starts up the character/symbol input part 105 to perform character editing. The character/symbol input part 105 scans to determine whether there is any unedited character remaining and, if there is such a character, the character/symbol input part 105 edits the unedited character in response to commands from the operator as will be described later (steps 904 to 911). This editing will continue until no more unedited characters remain (step 904). Where highlighted characters remain the operator is able easily to identify unedited data preventing omission of editing.

When the editing is complete the CPU 101 transfers the operation from the character/symbol input part 105 to the highlight graphic selection part 106. The highlight graphic selection part 106 resets the intensity (lightness) of all the characters to the previous state (step 912).

Next, the CPU 101 prompts the operator to select the next characters to be processed, then repeats the same procedures from steps 901 to 911.

The editing of characters carried out in steps 905 to 911 will now be explained.

In character processing, the operator inputs at first "pronounciation or Japanese reading" or "code" of characters from the keyboard 103a. The character/symbol input part 105 will transform "reading" or "code" entered through the input unit 103 into a row of characters that matches the operator's intention, through either a Kana-Kanji transformation function or a code-Kanji transformation function. Then, the CPU 101 transfers these rows of characters to the GT 108 to be displayed thereon (step 905). The rows of characters may be font characters, or rows of vector characters. If previously registered in ROMs or the like, pattern generation speed will be increased.

Also, the character/symbol input part 105 will generate a cursor corresponding to a character row pattern (step 906).

The character row patterns of the cursor are standardized in character sizes, directions and the like. However, not all characters added to e.g. maps are of the same size and direction. To cope with these situations, the character row formed by the cursor may be rotated, enlarged, or reduced accordingly (step 907).

Thus, for instance, with vector character patterns, the following transformation against the feature point coordinates $(x_i, y_i)(i\ TM\ 1, 2, \ldots n)$ is carried out, $$Xi = a(x_i - x_o) \cos \theta - b(y_i - y_o) \sin \theta$$

$$Yi = b(x_i - x_o) \sin \theta + a(y_i - y_o) \sin \theta \qquad (1.1)$$

where, a and b are the magnification rates in the horizontal and longitudinal directions, respectively, while $\theta$ is a rotation angle. These variables are capable of being set up on command from the operator for the size and direction of rotation of the cursor through the input unit 103. Also, the coordinates of a feature point $(x_i, y_i)$ is determined by the position of the cursor on the display.

Where there is some appropriate reference component with which to compare the alignment of the character rows, such as a frame in the background within which the character rows are to be contained, or when there are some lines of a figure to which the character rows are to be disposed in parallel, the positions, angles, and sizes of the rows of characters may be automatically set up by designating appropriate reference frames or lines. When graphics processing (editing) has already been carried out on these frames or lines to be used as a reference in the above embodiment, the subsequent procedures can be prompted by using the edited data.

Figure 11A:
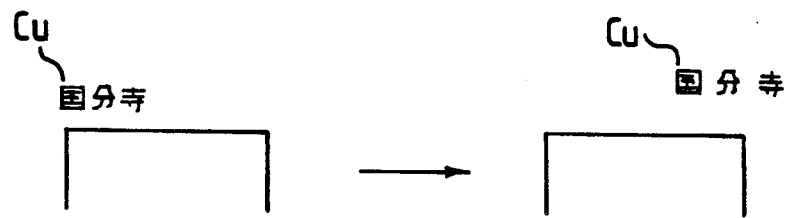
FIGS. 11(a) to 11(c) are diagrams which show an example of character cursor manipulation.
Figure 11B:
Figure 11C:
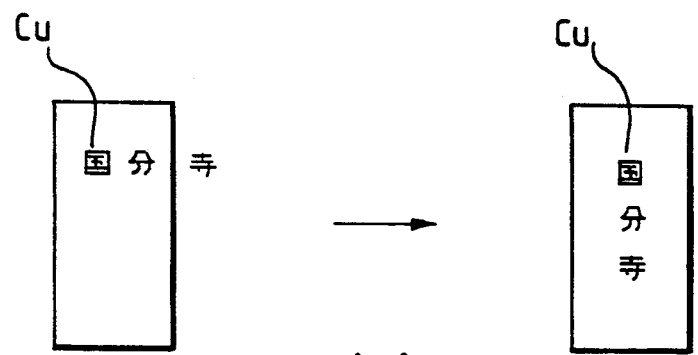

An example of manipulation of the character cursor is shown in FIG. 11. In FIG. 11(a) a cursor Cu consisting of a row of characters representing "Kokubunji" is shown enlarged and relocated. In FIG. 11(b), a cursor Cu consisting of a row of characters representing "Hitachi City" is shown rotated clockwise. In FIG. 11(c) a cursor Cu consisting of a row of characters representing "Kokubunji" is shown in which the characters are changed from a lateral form to a vertical form.

The cursor for the row of characters is moved to a preferred location in response to commands from the operator through the input unit 103, and entered thereon (step 908). FIG. 10(b) indicates the character cursor Cu immediately before overlying the vector data Vd.

The coordinates $(x_i, y_i)$ transformed by the equation (1.1) are transferred to the GT 108 consecutively to permit reshaping of the characters.

Thus, the redrawn or reshaped characters are recorded in the character table (step 909). The character/symbol input part 105 stores the row of characters of the cursor in the character table when the cursor of the row of characters is seen to have been placed in the preferred position, and has an appropriate size and the operator causes the characters to be recorded through the input unit 103. This character table may be set up, for instance in the memory unit 102a.

An example of the character table configuration is shown in FIG. 8(b).

In this character table there are stored the number of characters 811, character information 812, i.e. identification information on the character rows, an x-directional enlargement ratio 813, a y-directional enlargement ratio 814, a rotation angle 815, character pitch 816, and the codes 817 from 1 to n for the characters that have been arranged. In addition, in the character information 812 an inactivation bit 818 is set up as a flag showing whether it is active or inactive. Further, other attribute information may also be stored relating to the character rows.

Coding of constituent characters in the character rows will expedite retrieval of, for instance for a map, specific addresses, facilities and the like; and in the case of drawings or circuit diagrams, specified parts and components.

In the next step, after the character rows are redrawn and reshaped, the underlying vector data is erased or reduced in intensity (lightness). To effect this step, the vector data in the background is cut away in step 910. The CPU 101 starts up the highlight graphic selection part 106 to execute this step.

In this step, the highlight graphic selection part 106 obtains circumscribed quadrilaterals for the rows of characters. When it is defined that the length of one of the characters in the row is m; the height n; the pitch between characters L; and the number of characters k, then its circumscribed quadrilateral will be expressed so that its width is: $mk + L(k+1)$ including the left end and right end pitches, and its height: $n + 2L$. When its reference point is set at the lower left corner at $(x_o, y_o)$ the cordinates of its upper right corner will be expressed by:

$$(mk + L(k+1) + x_o, n + 2L + y_o) \qquad (1.2)$$

It can then be determined whether the coordinates of the design drafts in the background are contained within a rotated circumscribed quadrilateral or not by a reversion formula of equation (1.1).

$$xi = a(Xi + x_o) \cos \theta + b(Yi + y_o) \sin \theta$$

$$yi = -b(Xi + x_o) \sin \theta + a(Yi + y_o) \cos \theta \qquad (1.3)$$

If the four coordinates of $(x_i, y_i)$ obtained from the above equations are contained within a rectangle defined as follows, the coordinates of the design drawing in the background can be determined to be inside the circumscribed quadrilateral.

$(x_o, y_o)$ $(mk + L(k+1) + x_o, y_o)$ $(mk+L(k+1)+x_o, n+2L+y_o)$ $(x_o, n+2L+y_o)$

The graphics components representing design drawings within circumscribed quadrilateral are erased or reduced in intensity (lightness) at step 911. Erasure of the drawings in the background may be performed by turning the coordinate data to the same colour as the background of the GT 108. Dimming the vector data of characters may be performed by converting the intensity (lightness) and redrawing the same at a converted intensity.

FIG. 10(c) shows the character pattern after the row of characters, which was arranged by the character cursor, is recorded and the character vector data is erased.

In addition, when an additional step is provided for setting up inactivation flags in graphics data other than the characters, the number of graphics components to which the conversion equation (1.3) should be applied may be limited by using the flag judgement.

When editing of the characters is completed, the intensity (lightness) of characters/graphics is restored to the initial state, at step 912. The locations of characters which have not been edited can be easily identified because their graphics component will be highlighted relative to the designs in the background.

The above operation is repeated until there are no more unedited characters (step 904).

The display means discussed above may also be used for inputting other symbols, because for maps, for example, there is a need to input various geographical or map symbols in addition or as an alternative to characters.

In order to facilitate inputting of graphics data of e.g. various characters, symbols of different groups of graphics data, the sequence of highlight display may be preset. For this purpose, a table containing the sequence relative to each graphics feature is stored in the memory unit 102a. The highlight graphic selection part 106 inputs symbols of the designated kind with reference to this table, after completing a run, switches to the next highlight graphics by changing the intensity (lightness) of the kind of symbols to be input.

Figure 12:
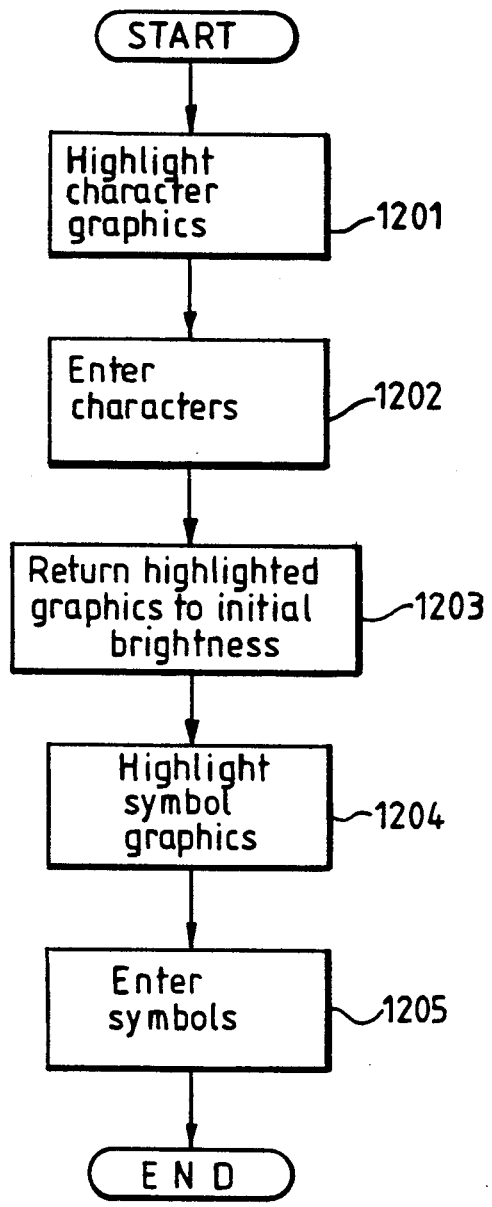
FIG. 12 is a flowchart showing an example of algorithms for continuously processing characters and symbols.

FIG. 12 shows an algorithm for inputting sequenced characters and symbols.

This algorithm will be executed by the highlight graphic selection part 106. Also, the recordal of this sequence will be performed by the highlight sequence scheduling part 107 in the same way as discussed above.

The highlight graphic selection part 106, when started by the CPU 101, refers to the schedule table in the memory unit 102a in the same way as described above. If a sequence of highlighting is set up in the schedule table in order of characters and symbols, the intensity (lightness) of graphics components representing characters may be set high first, in accordace with the pre-set order, and the intensity (lightness) of the other graphics components may be set to be low, so that only the characters are highlighted (step 1201). As discussed above, it is preferable if the intensity (lightness) for character data is, in practice, set at a normal display intensity (lightness) and the intensity (lightness) for other graphics components is instead set to be low.

Afterwards, processing of the characters is performed in the character/symbol input part 105 as described above (step 1202).

Then, upon command from the operator through the input unit 103 to terminate character processing, the highlight graphic selection part 106 restores the highlighting (lightness) of the display to the initial state (step 1203).

In accordance with the highlight sequence schedule, the highlight graphic selection part 106 proceeds with highlight processing for the symbols to be highlighted in the next step. Thus, the intensity (lightness) of the symbols in the hue information table is converted so as to allow only those symbols to have normal intensity (lightness), and other graphic data to have lower intensity (lightness) (step 1204).

The symbols, after being highlighted will be processed at step 1205.

The highlight graphic selection part 106 may be designed so as automatically to proceed to the next highlight object processing when all the data pertaining to the highlighted graphic data groups have their highlighting reduced, without waiting for the operator's command.

The graphic data processed in the above steps are stored in the memory unit 102a, and may be transferred to the external memory unit 102b as appropriate, to be stored therein.

Also, the graphics data may be printed out by a connected printer as will be described later.

The graphic editor processing unit of the above embodiment is provided with independent units corresponding to the graphic edit processing part 104, the character/symbol input part 105, the highlight graphic selection part 106, and the highlight sequence scheduling part 107. Each of those units is connected to the information processing unit so as to constitute the system. The present invention, however, is not limited to the embodiments described above, and may be accomplished by programmed operation of these functions in the computer 101.

Figure 13:
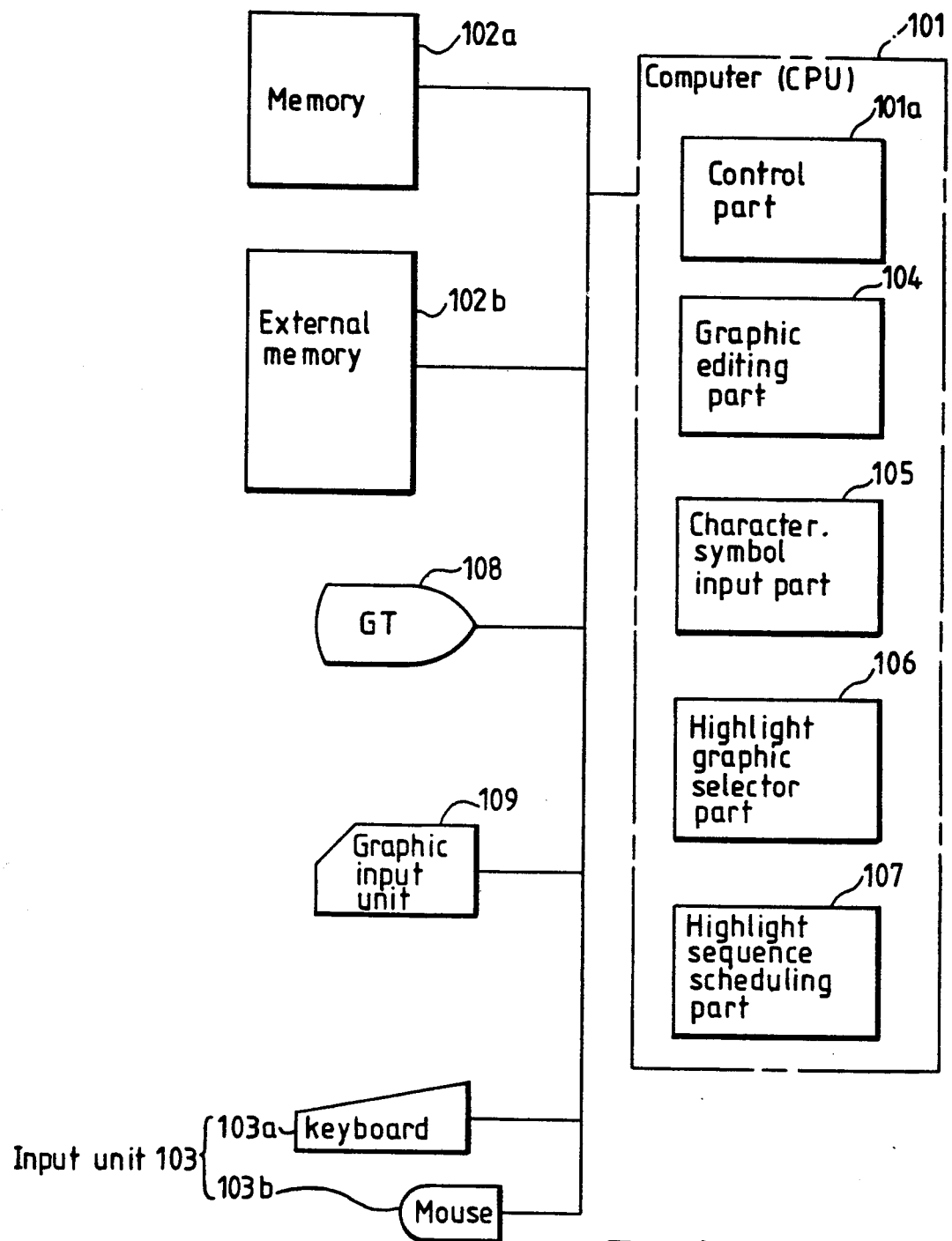
FIG. 13 is a block diagram showing the constrction of a second embodiment of an apparatus for modifying a graphics display image according to the present invention.

FIG. 13 shows an embodiment of the graphic, edit processing system having such a construction.

The graphic edit processing system of this embodiment applied to the information processing unit, as shown in FIG. 13 has a computer (CPU) 101, a memory unit 102a, an external memory unit 102b, a graphic display (GT) 108, a graphic input unit 109, and an input unit 103 consisting of a keyboard 103a and a mouse 103b.

Each of these units is the same in principle, as in the embodiment described in FIG. 1B. It is more preferable for the computer 101 to be large scaled and high speed, or of multiprocessor type.

The computer 101 is capable of performing each function of the control part 101a functioning as an operating system, graphic edit processing part 104, character/symbol input part 105, highlight selection part 106 and highlight sequence scheduling part 107. Each of these functions is capable of being accomplished through execution of corresponding programs in the CPU 101. These programs are stored in a memory such as a magnetic disk, or optical disk or may be supplied in a ROM.

When supplied in a storage medium such as a magnetic disk, the graphic edit processing system programs are transferred from the external memory unit 102b to the memory unit 102a. In this embodiment, the graphic edit processing system corresponds to the computer which reads the programs in sequence and executes those programs.

It is preferable for the control part 101a to be provided with a guidance function which will be displayed on the GT 108 to help the operator in the various manipulations that are to be carried out. Should such functions be provided, interactive graphic edit processing becomes possible, allowing even unskilled persons easily to continue such processing.

Figure 14:
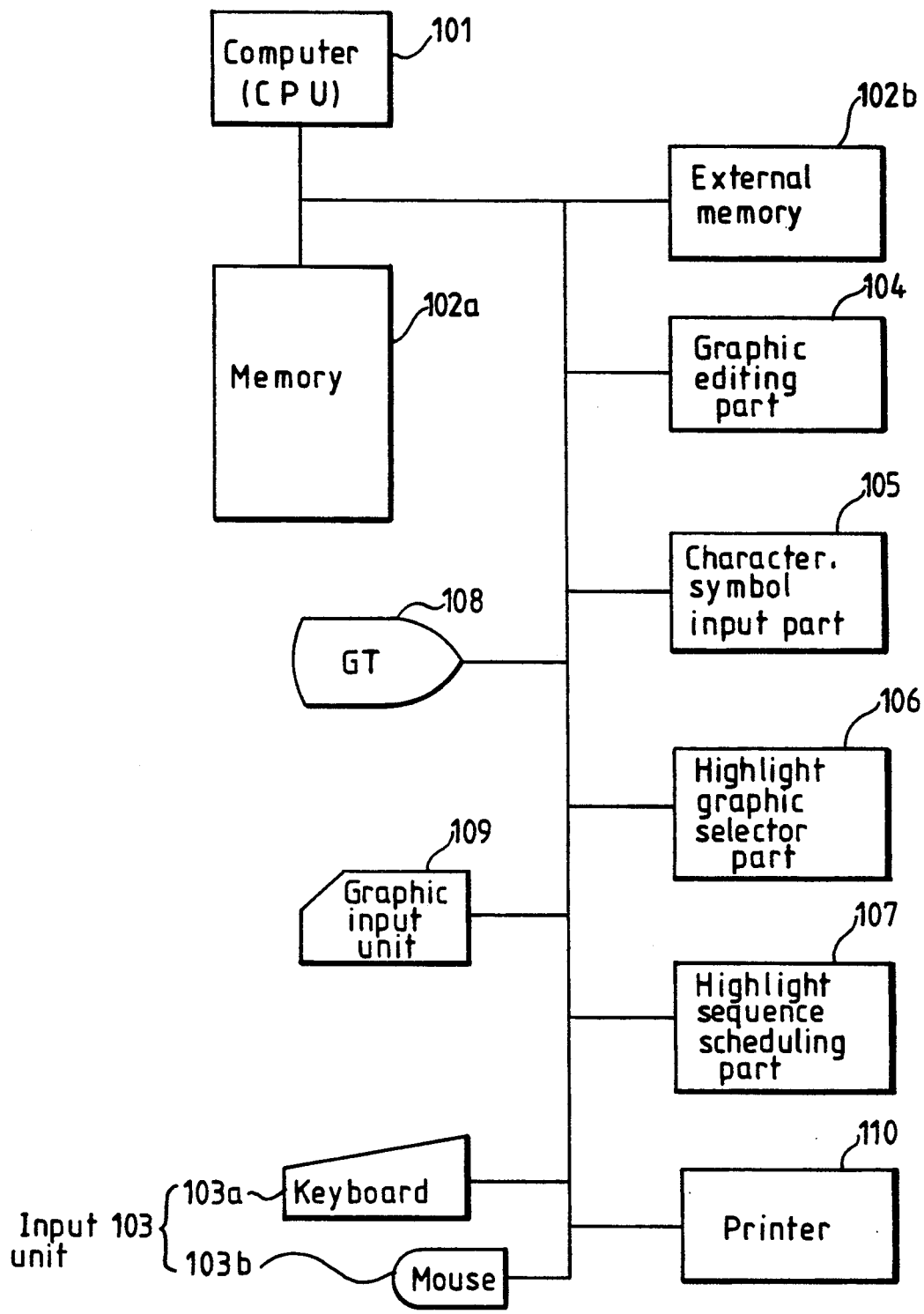
FIGS. 14 and 15 are block diagrams showing further embodiments, similar to the embodiments of FIG. 1 and FIG. 13, but each having a printer.
Figure 15:
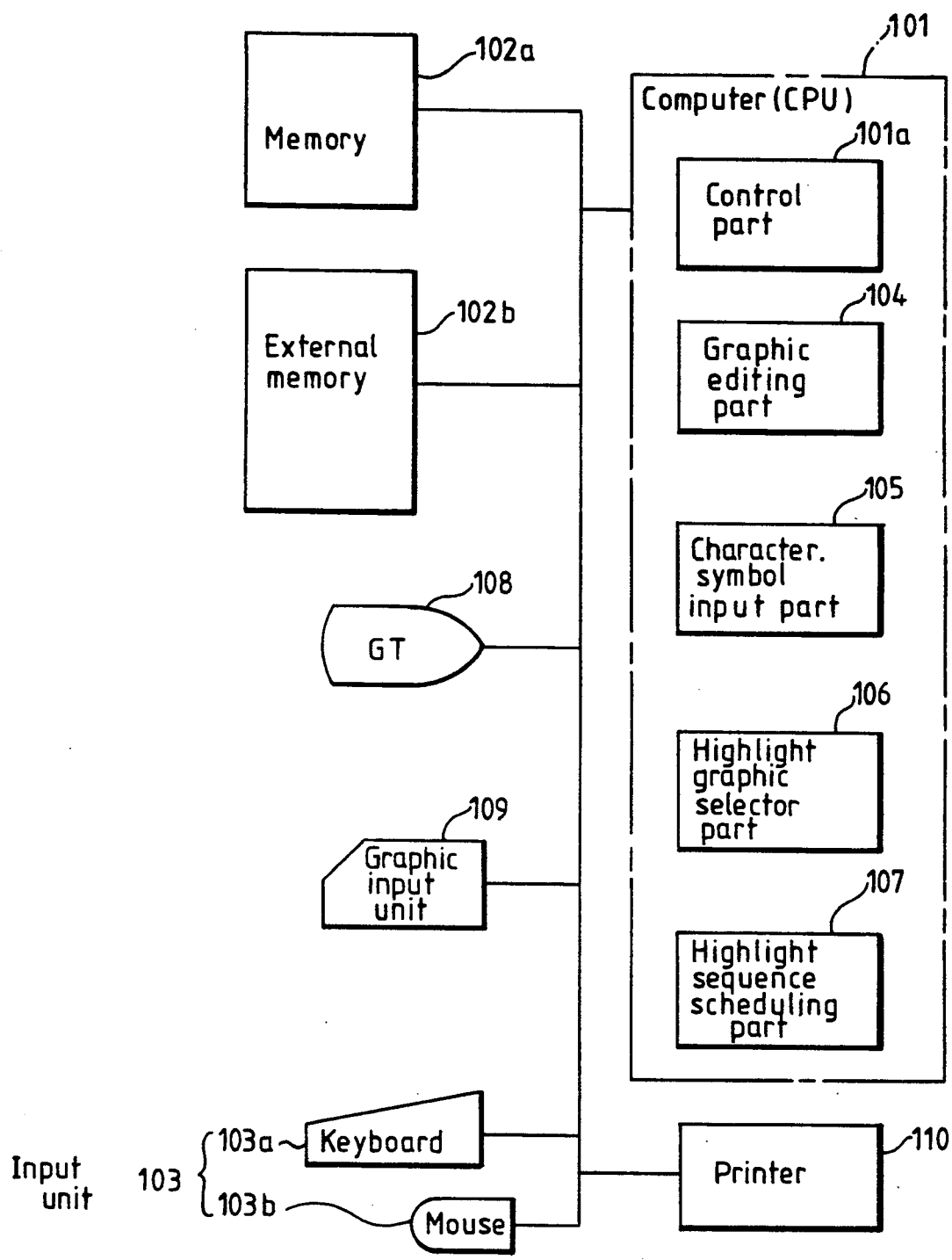
Figure 16:
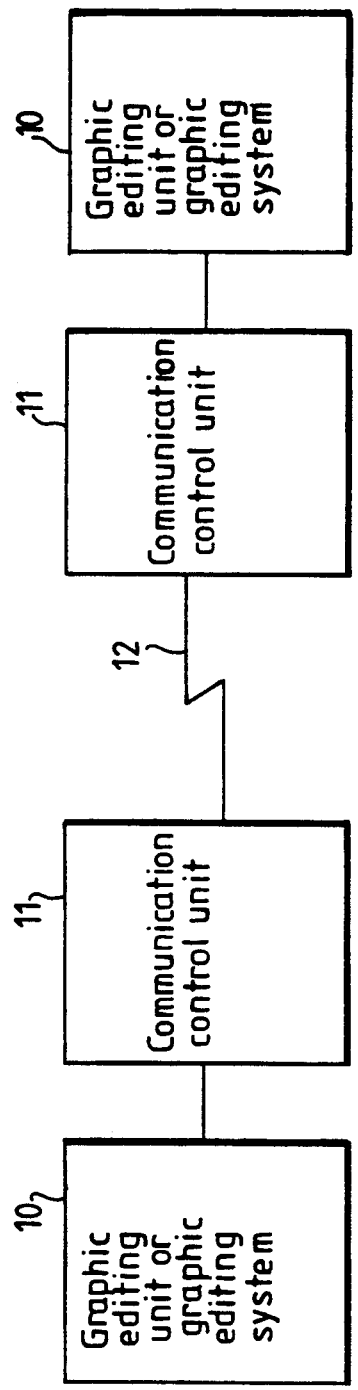
FIGS. 16 and 17 show block diagrams of embodiments wherein apparatus for modifying graphics display images are connected by communication paths.
Figure 17:
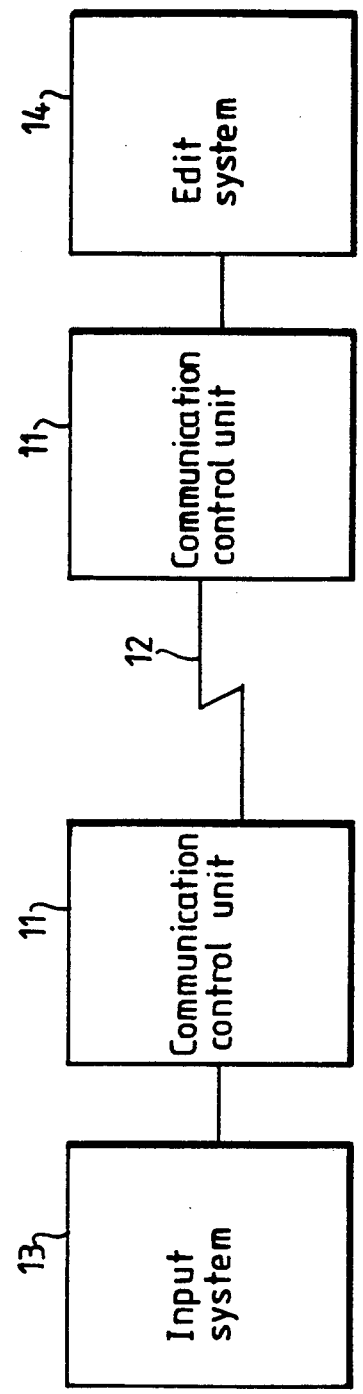

A printer may be connected to respective units of the above embodiments,. FIGS. 14 and 15 show embodiments of a graphics edit processing unit and system which includes a printer 110 such as e.g. a laser beam printer. In these embodiments, because components other than the printer are the same in principle as those of the embodiments of FIGS. 1A and 13, the following explanation will concentrate on the printer, referring to FIGS. 14 and 15.

In these embodiments, graphic data stored in the memory 102a or the external memory unit 103b are printed out through the printer 110 to make printed copies of e.g. maps, circuit diagrams, and designs. In this case, not only graphics data after editing but also those before processing can be printed out. Also, graphics data of different categories or groups may be printed out independently without being synthesized on the same sheet of paper. These commands are enabled for example, through the input unit 103.

In addition, colour printing may also be achieved on the printer 110. In such a case, graphics data can be printed out in colours corresponding to the feature colour codes described previously.

The description of FIG. 11 above introduced the idea of a character cursor. Further examples of such a cursor will now be discussed with reference to FIGS. 18 to 22.

Figure 18:
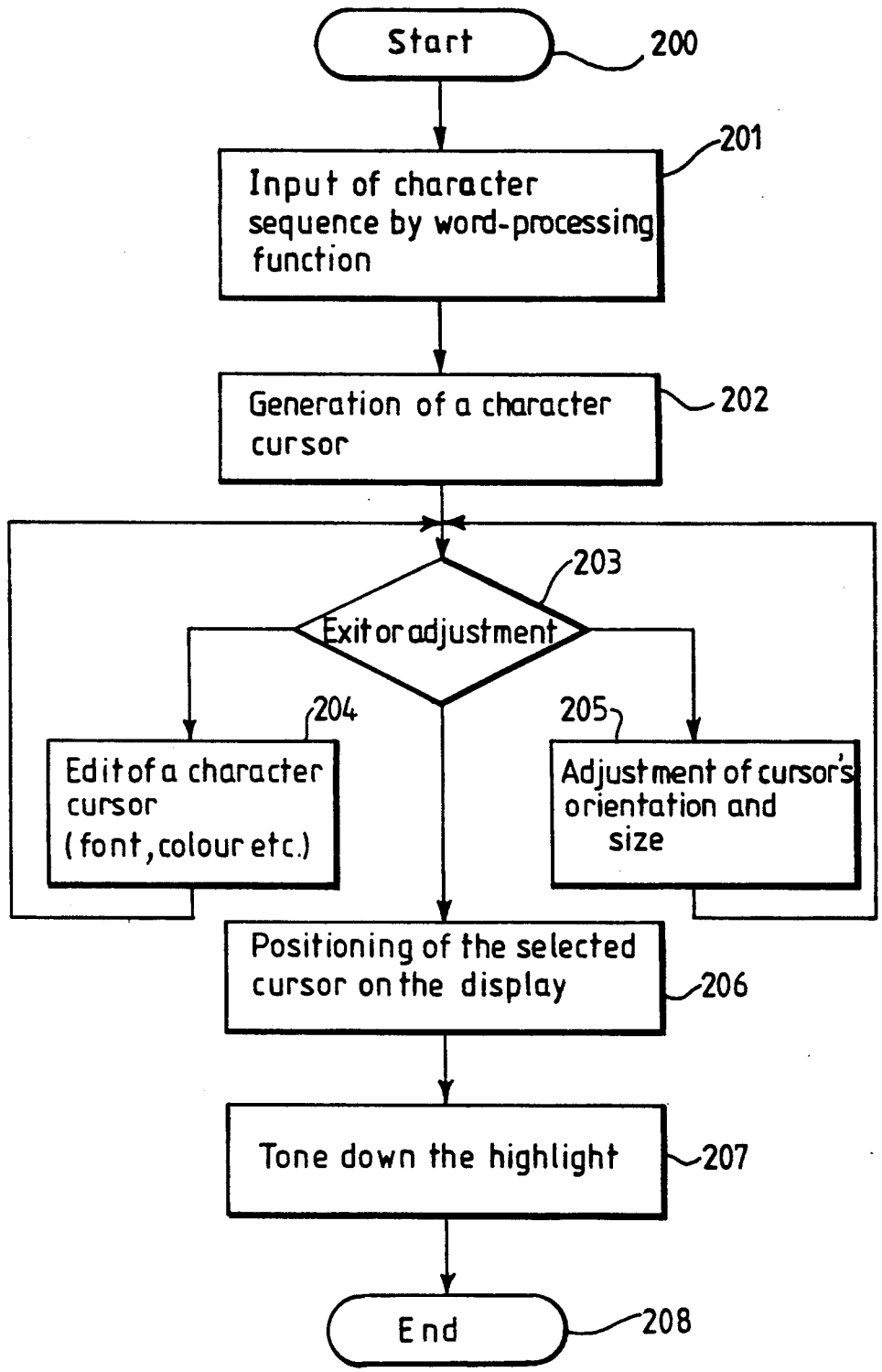
FIG. 18 is a flow chart showing the steps involved in a processing method using a character cursor.

FIG. 18 shows a block diagram of a method of modifying a graphics display image, using a character cursor, in which the character cursor is formed by a plurality of separate characters, such as letters or their equivalents (Chinese characters, Japanese characters). In FIG. 18, processing starts at a step 200, and then, at a step 201, the appropriate sequence of characters (letters, etc.) is input to the apparatus for modifying the graphics display image by using word-processing, or similar character input. Then, at a step 202, the apparatus generates a character cursor corresponding to that character sequence and displays that character cursor on the display of the apparatus. Processing then moves to a step 203 at which the operator has three choices. Firstly, indicated by step 204, the operator may edit the character cursor, by changing the font type, colour, etc., of the characters of the cursor. Once such editing has been completed, processing returns to step 203. The second alternative, at step 203, is for the orientation and/or size of the cursor to be changed. This is shown as step 205. Again, after this adjustment, processing returns to step 203. By carrying out the steps 204 and 205 as appropriate, the operator is able to generate a character cursor in which the characters have a desired configuration. The resultant character cursor is then positioned to the appropriate place on the display, at a step 206, by moving the character cursor to the location of the graphics display image component that is to be edited, which editing is to bring the image component to correspond to the characters of the character cursor. When correct positioning is achieved, the graphics display image component is replaced by the characters of the character cursor, and the appropriate changes made to the graphics data representing the graphics display image component. This completes the editing of that component, and the highlighting of the selected component can then be reduced, in a step 207. If editing is then complete, processing ends at step 208. However, if editing is not complete, there are then two alternatives. If the same character cursor is to be used to edit corresponding characters at a second location in the display, then processing can return to step 203. If, on the other hand, a new character cursor is needed, processing returns to step 201.

Figure 19A:
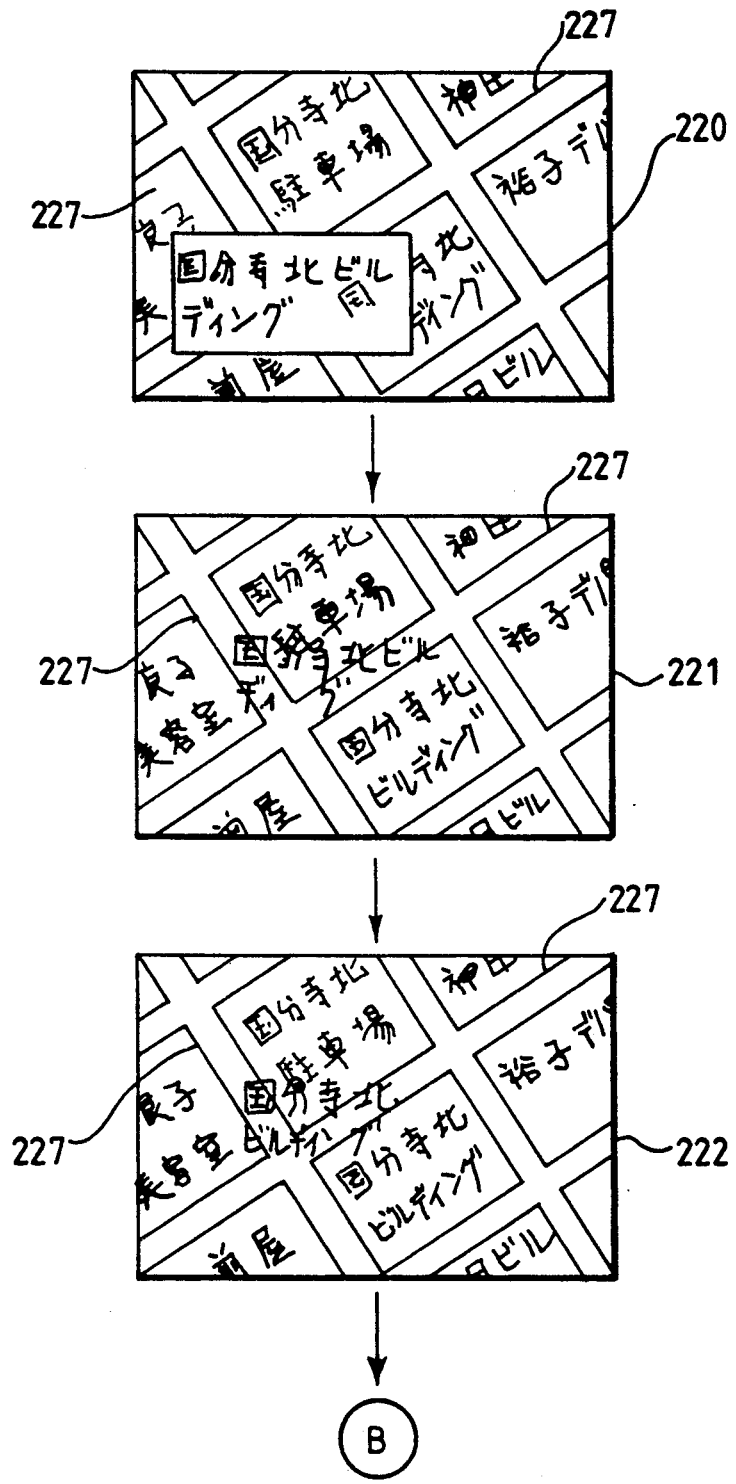
FIG. 19a and 19b show steps in the editing operation using a character cursor.
Figure 19B:
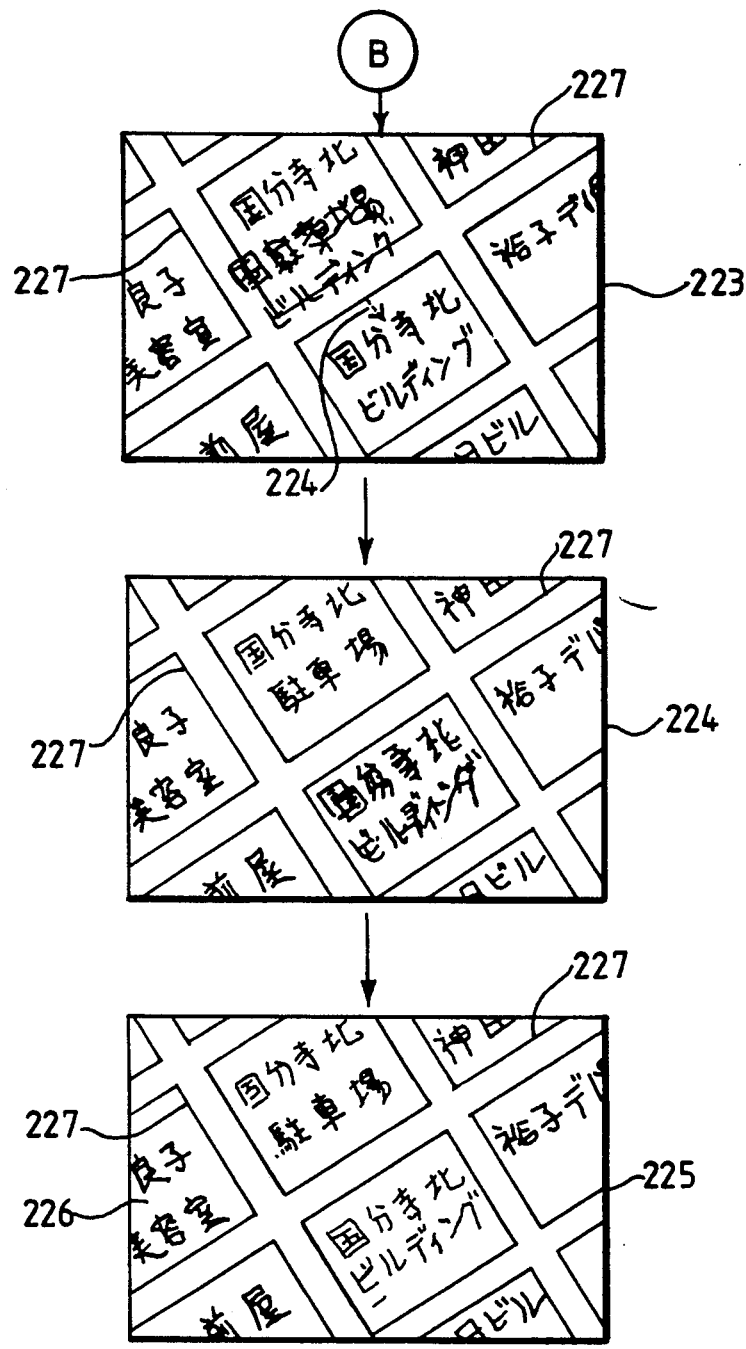

FIGS. 19a and 19b show graphically the steps involved in the method described with reference to FIG. 18. Firstly, display 220 shows the generation of the character cursor. This corresponds to step 202, and involves input of the relevant characters. As shown in display 220, the characters being input are displayed in a separately identifiable box, and when all the appropriate characters have been input, and thus step 202 is complete, the box is removed as shown by display 221.

Display 222 shows editing of the character cursor, corresponding to step 204, in which the relative positions of the characters within the character cursor are changed, so that the wording of the character cursor reads more clearly. Display 223 in FIG. 19b then shows processing corresponding to step 205 in FIG. 18, in which the orientation of the cursor is changed to match the orientation of the characters to be edited. Then, the cursor is moved in the direction of arrow 224 so that the cursor overlaps the characters to be edited, as shown by display 224. Editing is then carried out by a replacement of the characters with the characters of the character cursor, and the edited characters are toned down, so they are no longer highlighted, as shown by display 225.

A further character cursor may then be created to edit the characters in e.g. region 226 of the display 225. It should also be noted, in FIGS. 19a and 19b, that the displays are concerned with entering text in a street map, and thus the pattern of streets is displayed in the display 220 to 225 by non-highlighted lines 227 so that the character cursor may be positioned correctly.

In the display method of FIGS. 18, 19a, and 19b, and also in FIG. 11, the character cursor is formed by characters which represent words. However, the characters of the character cursor may alternatively, or in addition, be symbols. An arrangement will now be discussed, with reference to FIG. 20, FIG. 21a and FIG. 21b in which such a symbol cursor is used.

Figure 20:
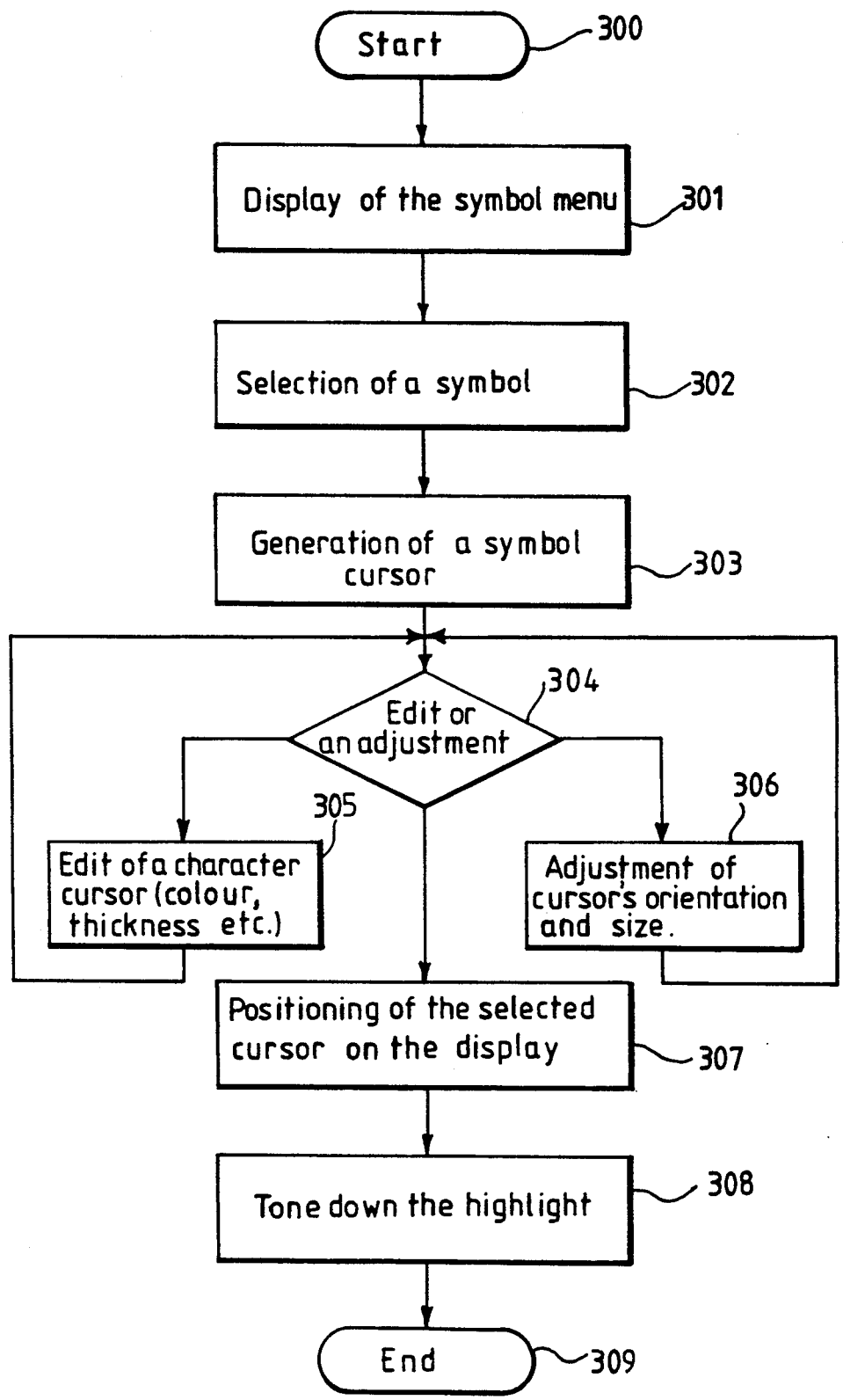
FIG. 20 is a flow chart showing the steps involved in a further processing method using a further character cursor.

FIG. 20 shows the processing steps involved in the use of such a symbol-based character cursor, and, after the start of processing at step 300, the display displays a menu of the symbols which may be used in the formation of the character cursor. Then, at a step 302, the user selects a symbol, which then forms the basis of the character cursor. Step 303 shows the generation of such a character cursor, as a symbol cursor, but it can be noted that step 302 may be repeated a plurality of times, so that the symbol cursor generated at step 303 contains a plurality of characters from the symbol menu displayed at step 301.

Subsequently, the character cursor (symbol cursor) is manipulated in the same way as the character cursor of FIG. 18, so that steps 304 to 309 in FIG. 20 correspond to steps 203 to 208. Of course, the editing operations that are carried out at step 304 will be slightly different from those carried out at step 203 in FIG. 18, because the editing in step 305 is concerned with a cursor containing symbols, rather than letters or equivalents, but the basic principle is the same.

Figure 21A:
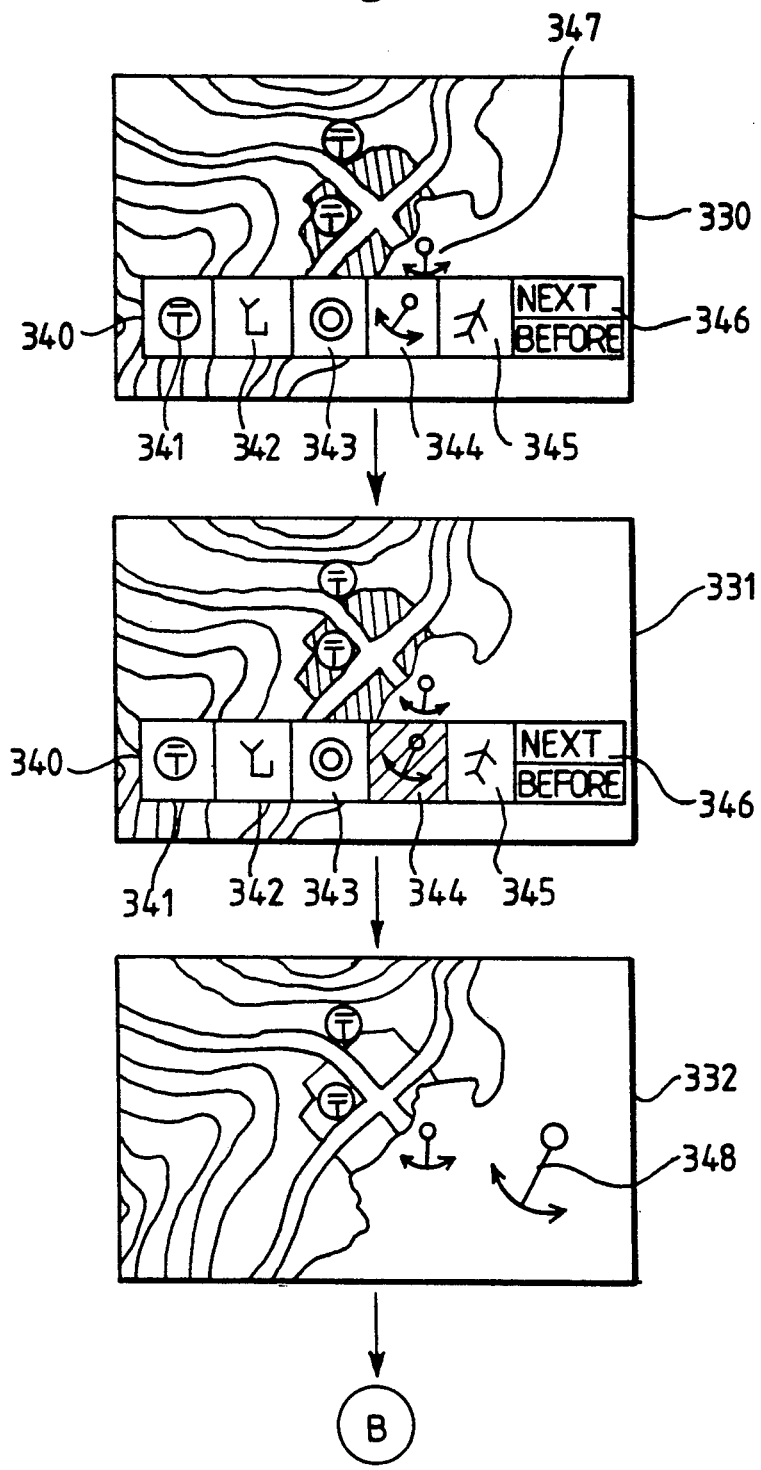
FIG. 21a and FIG. 21b show stages in the editing of the operations using the further character cursor.
Figure 21B:
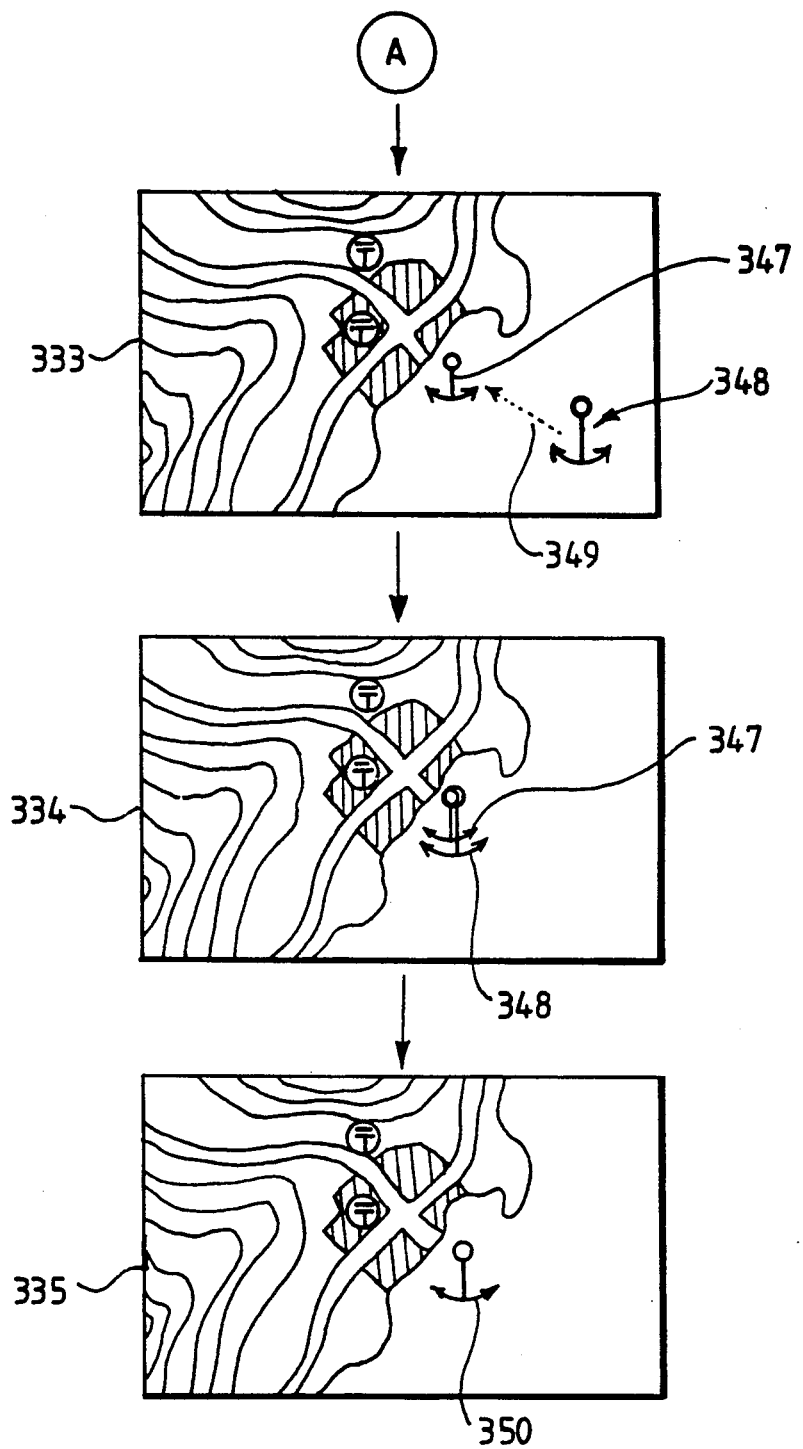

FIG. 21a and 21b then show an example of the use of such a character cursor based on a symbol. Display 330 shows a map on which graphical symbols are to be edited, and the symbols are displayed in a symbol menu 340. Thus, the symbol menu 340 shows a symbol 341 representing a Post Office, a symbol 342 representing a mulberry orchard, a symbol 343 representing a city government office, a symbol 344 representing a harbour, and a symbol 345 representing an airport. Of course, the symbols are examples only, and any number and type of symbols may be displayed. As shown in FIG. 21a, the symbol menu 340 also has an indicator part 346 for assisting the operator in selection of the appropriate symbol.

Let us now suppose that the symbol to be edited is the harbour symbol 347 in display 330. First, as shown by display 331, the symbol 344 in the symbol menu 340 representing the harbour is selected, the operation corresponding to step 302 in FIG. 20. After that symbol 344 has been selected, the symbol 340 may be removed from the display as shown in display 332, in which the character cursor (symbol cursor) is shown as 348.

Next, as shown by display 333, the character cursor (symbol cursor) 348 is edited, corresponding to steps 304 to 306, until it is of the correct size and orientation. Then, the character cursor (symbol cursor) 348 is moved in the direction of arrow 349 until, as shown in display 334, the character cursor (symbol cursor) 348 is positioned at a location corresponding to the location of the symbol 347 that is to be edited. Finally, as shown by display 335, the symbol 347 is replaced by the symbol of the character cursor 348, and the highlighting of that symbol is removed, so that an edited symbol is displayed, and graphics display image data corresponding to the edited symbol 350 is stored in a suitable memory.

Figure 22:
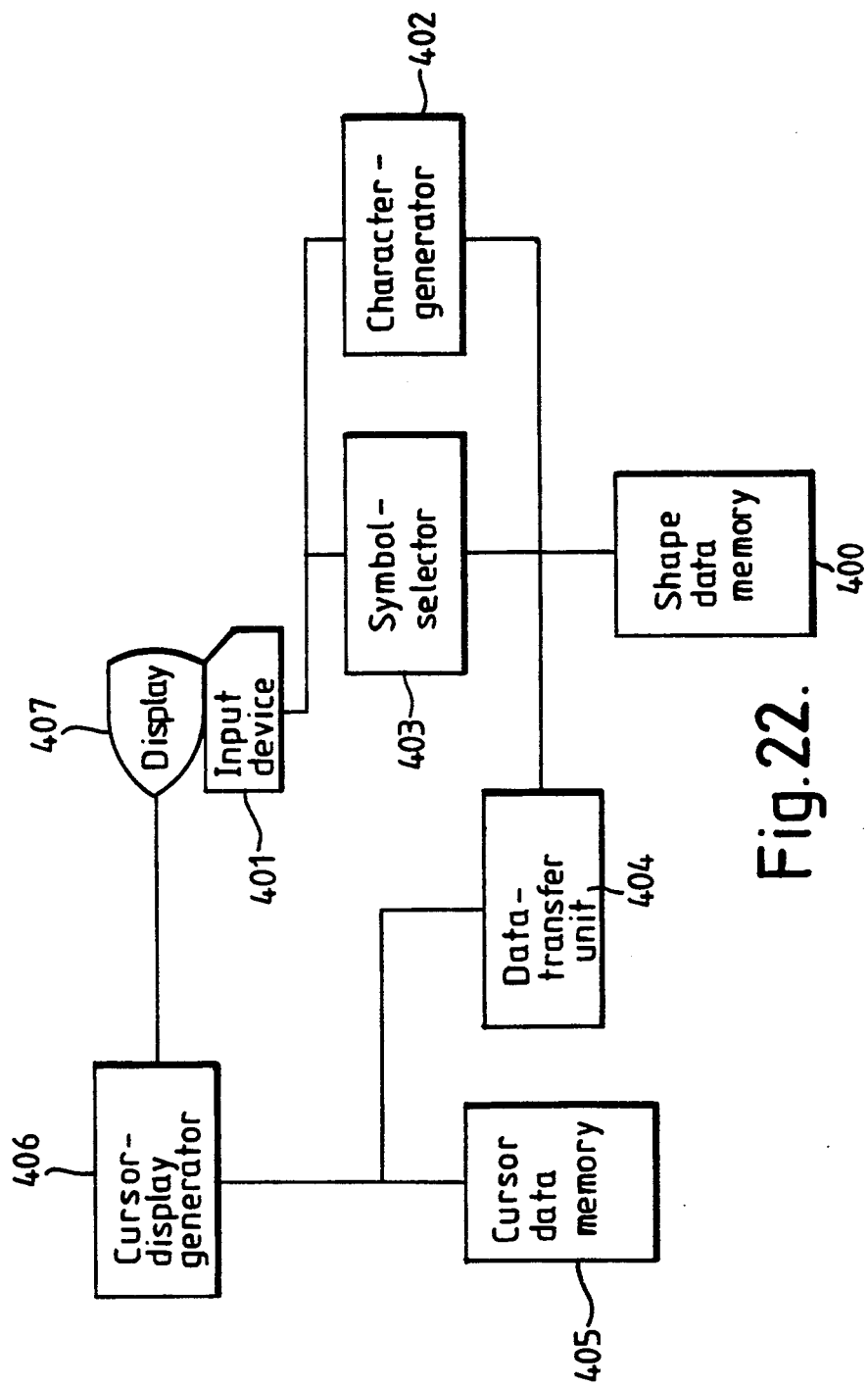
FIG. 22 is a block diagram of an apparatus for modifying a graphics image according to the present invention, using the character cursor of FIGS. 19a and 19b or FIGS. 21a and 21b.

FIG. 22 shows components necessary to create and display such a character cursor. In FIG. 22, only the components necessary for the creation and generation of the character cursor are shown, and other components will be necessary to store and display the graphics display image. However, the arrangement of such components may be, e.g. as shown in FIG. 1.

Referring to FIG. 22, a shape data memory 400 stores data representing symbols, letters, etc which will form the character cursor, and the user selects the appropriate character cursor by providing a suitable input at an input device 401, which is connected to a character generator 402 and a symbol selector 403. Where the character cursor is to contain letters, the input device 401 signals to the character generator 402 to retrieve the appropriate letters, etc., from the shape data memory 400. This would correspond to step 201 in FIG. 18. In a similar way, where the character cursor is to be one or more symbols, the input device 401 signals to the symbol selector 403 to retrieve the appropriate symbols shape data memory 400. This corresponds to step 302 in FIG. 20. The selected data is then transferred via a data transfer unit 404 to a cursor data memory 405. The cursor data in this memory 405 may be manipulated (corresponding to steps 203 to 205 or 304 to 306) so that the cursor has the desired orientation. Using the data in the cursor data memory 405, a cursor display generator 406 displays the cursor on a display 407. As the data in cursor data memory 405 is changed (edited) the cursor displayed on the display 407 will be changed by the cursor display generator 406. The displayed character cursor may be manipulated by the input device 401, and editing may be achieved as previously described.

Other embodiments of the present invention will now be described.

The graphic editor processing unit and graphic editor processing system are capable of being connected to a graphic data input system.

Further the present invention is capable of taking an arrangement as follows.

In the editing carried out in embodiments of the present invention, it is possible to preset cursor patterns of graphics components to be used as icons on the display, with those cursor patterns being cursor-movable by a mouse, and to move the cursor patterns to a preferred position. It will be advantageous if an appropriate magnification is possible on command to generate graphics with a suitable area.

In the embodiments above, editing of graphics components such as squares and the like, and editing of characters and symbols have been described. This invention, however, is not limited to the above embodiments, but is capable of being applied to editing of various other image data.

Also, the above embodiments may be arranged to provide an edit processing unit or system which is capable of processing only graphics, or which is capable of processing only characters/symbols or which is capable of processing both.

Furthermore, the above embodiments, have been provided with a set of units including the graphic edit processing part 104, the character/symbol input part 105, the highlight graphic selection part, and the highlight sequence scheduling part 107. Within the present invention, however, a part of the function of each may be omitted in accordance with the object of the respective units or results to be achieved, or different functions may be added. Such an additional function includes, for example a database processing function. Examples of applications of the present invention will now be described.

The present invention is capable of being applied to:

(i) graphics objects that can be expressed by a coordinate system such as in maps, marine charts, piping drawings, wiring drawings, and design drawings;

(ii) to digitization of information relating to the above graphics objects or the interrelationship between the those graphics objects.

For example, this invention can be applied to computer mapping systems wherein map information is digitized so that it can be stored as a database, or to the administration systems for city water, electricity and/or gas facilities, or to design drawing administration systems.

Figure 23:
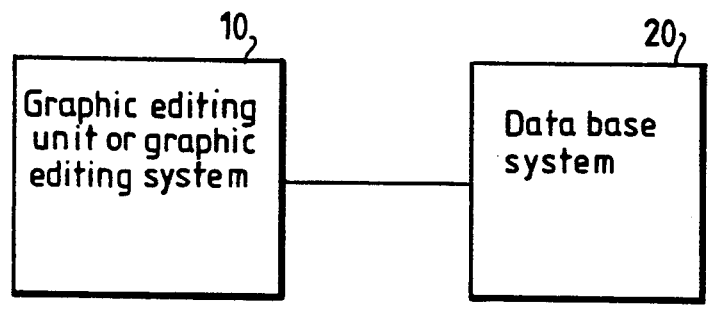
FIGS. 23 and 24 are block diagrams showing further embodiments wherein an apparatus for modifying a graphics display image is part of a database.
Figure 24:
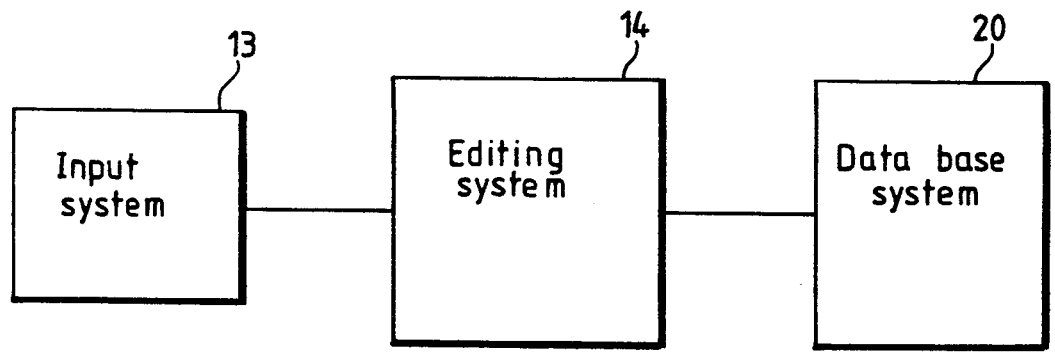

FIG. 23 shows a map/drawing database system with a graphic edit processing unit or graphics editor processing system 10 and a database system 20 to enter map/graphics data. FIG. 24, shows an alternative arrangement in which an input system 13, an edit processing system 14, and a database system 20 are connected to one another.

This invention may also be applied widely to printing out of hand-written drafts or documents. For example a graphic support system for tracing graphics over the draft designs may be constructed using the graphic edit processing unit or graphic edit processing system selected from the embodiments shown in FIGS. 1B, 13, 14 and 15, This invention is not limited to the use of vector data, but is applicable to image data.

Because it has been made possible to highlight only such graphics which are necessary for editing according to the present invention, even where very complicated patterns exist and are combined together, only the selected graphics components for editing may be selected promptly and advantageously.

Also, according to the present inveniton, it is possible to activate only selected graphics components in editor processing, relieving the operator from the work load of graphic selection resulting in improved efficiency and quality of editing.

According to the present invention, it is possible for editing to be performed without omission and with certainty. Thus confirmation of the editing inputs becomes unnecessary, as a result electronic digitalization steps and computer input of graphics objects is significantly reduced.

What is claimed is:

1. A method of modifying a graphics display image, which graphics display image comprises a plurality of graphics display image groups, each of said graphics display image groups being composed of a plurality of graphics display image components which have a predetermined common characteristic with respect to each other, the method comprising the steps of:
   a) displaying the plurality of graphics display image components of said graphic display image groups on a display;
   b) editing sequentially at least some of said plurality of graphics display image components in at least a selected one of said graphics display image groups; and
   c) changing the visual appearance of each of said at least some of said graphics display image components sequentially on completion of the editing of each one of said at least some of said plurality of graphics display image components.

2. A method according to claim 1, wherein each of said plurality of graphics display image components is formed from vector data.

3. A method according to claim 1, wherein said editing of said at least some of said plurality of graphics display image components comprises sequentially altering the shape of said at least some of said display components.

4. A method according to claim 1, wherein said editing of said at least some of said plurality of graphics display image components comprises selectively and sequentially replacing each of said at least some of said plurality of graphics display image components with a corresponding pre-recorded graphics display image component.

5. A method according to claim 4, wherein said replacing of each of said at least some of said plurality of graphics display image components comprises, for each one of said at least some of said plurality of graphics display image components, selecting one of said plurality of pre-recorded graphics display image components, moving said selected one of said pre-recorded graphics display image components as a cursor on said display screen to coincide with the visual location of the corresponding one of said at least some of said plurality of graphics display image components, and replacing that one of said at least some of said plurality of graphics display image components with the corresponding one of said prerecorded graphics display image components in said graphics display image.

6. A method according to claim 5, wherein at least some of said pre-recorded graphics display image components are displayed on a part of said display screen separate from said graphics display image, prior to the selection thereof.

7. A method according to claim 5, wherein some of said pre-recorded graphics display image components are formed by combination of others of said pre-recorded graphics display image components.

8. A method according to claim 1, wherein said plurality of graphics display image components are displayed with a predetermined intensity in step (a) and said step (c) of changing the visual appearance of each of said at least some of said graphics display image components comprises reducing the intensity of each of said at least some of said plurality of graphics display image components after the completion of the editing thereof.

9. A method according to claim 8, wherein said graphics display image includes a plurality of further graphics display image components, said further graphics display image components being displayed on said display screen with an intensity less than said predetermined intensity.

10. A method according to claim 1, wherein said plurality of graphics display image components are displayed with a predetermined colour in step (a) and said step (c) of changing the visual appearance of each of said at least some of said graphics display image components comprises changing the colour of each of said at least some of said plurality of graphics display image components after the completion of the editing thereof.

11. A method according to claim 1, further including:
   reading graphics objects corresponding said plurality of graphics display image components from a print including graphics objects corresponding to said plurality of graphics display image components; and
   storing data representing said graphics objects corresponding to said plurality of graphics display image components in a memory;
   said stored data being used to form said display of said plurality of said graphics display image components in said step (a).

12. A method according to claim 1, wherein said plurality of graphics display image components are divided into a plurality of groups, one of said groups is selected for editing of the graphic display image components thereof, and editing of graphic display image components of other groups is inhibited until editing of all the graphic display image components of said selected one of said groups is completed.

13. A method according to claim 12, wherein after selection of said one of said groups, the visual appearance of the graphic display image components of said selected group is caused to differ from the graphics display image components of said other groups.

14. A method of modifying a graphics display image, which graphics display image comprises a plurality of graphics display image groups, each of said graphics display image groups being composed of a plurality of graphics display image components which have a predetermined common characteristic with respect to each other, the method comprising the steps of:
   a) displaying said plurality of graphics display image components of said graphics display image groups on a display; and
   b) editing sequentially at least some of said plurality of graphics display image components in at least a selected one of said graphics display image groups, said editing comprising, for each one of said at least some of said plurality of graphics image components, selecting one of a plurality of pre-recorded graphics display image components, moving said selected one of said pre-recorded graphics display image components as a cursor on said display screen to coincide with the visual location of the corresponding one of said at least some of said plurality of graphics display image components, and replacing that one of said at least some of said plurality of graphics display image components with the corresponding one of said pre-recorded graphics display image components in said graphics image display.

15. A method according to claim 14, wherein at least some of said pre-recorded graphics display image components are displayed as a part of said display screen separate from said graphics display image prior to the selection thereof.

16. A method according to claim 14, wherein at least some of said pre-recorded graphics display image components are formed by combination of others of said pre-recorded graphics display image components.

17. An apparatus for modifying a graphics display image, which graphics display image comprises a plurality of graphics display image groups, each of said graphics display image groups being composed of a plurality of graphics display image components which have a predetermined common characteristic with respect to each other, the apparatus comprising:
  memory means for storing data representing said plurality of graphics display image components;
  a display for displaying the plurality of graphics display image components of said graphics display image groups;
  means for editing sequentially the data representing at least some of said plurality of graphics display image components in at least a selected one of said graphics display image groups; and
  means responsive to said editing for causing said display to change the visual appearance of said at least some of said plurality of graphics display image components sequentially on completion of the editing of each one of said at least some of said plurality of graphics display image components.

18. An apparatus according to claim 17, further including means for reading graphics objects corresponding to said plurality of graphics display image components from a print including said graphics objects corresponding to said plurality of graphics display image components; and means for converting the read graphics objects of said data in said memory means.

19. An apparatus for modifying a graphics display image, which graphics display image comprises a plurality of graphics display image groups, each of said graphics display image groups being composed of a plurality of graphics display image components which have a predetermined common characteristic with respect to each other, the apparatus comprising:
  first memory means for storing data representing said plurality of graphics display image components of said graphics display image groups;
  second memory means for storing data representing a plurality of pre-recorded graphics display image components;
  a display for displaying said plurality of graphics display image components of said graphics display image groups, said display including means for displaying at least a selected one of said pre-recorded graphics display image components as a cursor; and
  means for editing sequentially the data representing at least some of said plurality of graphics display image components in a selected graphics display image group, by replacement of the data representing each of said at least some of said plurality of graphics display image components in the selected graphics display image group sequentially with the data representing a corresponding one of said pre-recorded graphics display image components when the cursor of that one of said prerecorded graphics display image components coincides with the corresponding one of said at least some of said plurality of graphics display image components on said display screen.

20. A graphics display database system, comprising:
  means for reading a plurality of graphics display image components of a plurality of graphics display image groups from a print including said plurality of graphics display image components, each of said graphics display image groups being composed of a plurality of graphics display image components which have a predetermined common characteristic with respect to each other;
  memory means for storing data corresponding to each of said plurality of graphics display image components of said graphics display image groups;
  means for associating with the data for each of said plurality of graphics display image components further data representing a selected visual appearance for each of said plurality of graphics display image components;
  means responsive to edit instructions for editing sequentially the data corresponding to any of said plurality of graphics display image components in a selected graphics display image group; and
  means responsive to instructions indicating the completion of said editing for changing further data of said any of said plurality of graphics display image components in said selected graphics display image group such that the changed further data represents a different visual appearance for said any of said plurality of graphics display image components.

* * * * *